US012649524B2

(12) United States Patent
Kim et al.

(10) Patent No.: US 12,649,524 B2
(45) Date of Patent: Jun. 9, 2026

(54) FRONT SIDE MEMBER FOR VEHICLE

(71) Applicant: POSCO Co., Ltd, Pohang-si (KR)

(72) Inventors: Jaehyun Kim, Incheon (KR);
Hong-Woo Lee, Incheon (KR);
Dong-Yoon Seok, Seoul (KR)

(73) Assignee: POSCO CO., LTD, Pohang-si (KR)

( * ) Notice: Subject to any disclaimer, the term of this patent is extended or adjusted under 35 U.S.C. 154(b) by 414 days.

(21) Appl. No.: 18/037,268

(22) PCT Filed: Jul. 6, 2021

(86) PCT No.: PCT/KR2021/008566
§ 371 (c)(1),
(2) Date: May 16, 2023

(87) PCT Pub. No.: WO2022/108032
PCT Pub. Date: May 27, 2022

(65) Prior Publication Data
US 2023/0415820 A1    Dec. 28, 2023

(30) Foreign Application Priority Data
Nov. 18, 2020    (KR) ........................ 10-2020-0154868

(51) Int. Cl.
B62D 25/08        (2006.01)
B62D 21/15        (2006.01)
(52) U.S. Cl.
CPC ........... B62D 25/08 (2013.01); B62D 21/152 (2013.01)
(58) Field of Classification Search
CPC .. B60Y 2306/01; B62D 21/15; B62D 21/152; B62D 25/08; B62D 25/082
See application file for complete search history.

(56) References Cited

U.S. PATENT DOCUMENTS

2008/0054683 A1    3/2008    Takeda
2009/0236166 A1    9/2009    Kowaki et al.
(Continued)

FOREIGN PATENT DOCUMENTS

CN        102725191 A    10/2012
CN        102741112 A    10/2012
(Continued)

OTHER PUBLICATIONS

International Search Report dated Feb. 21, 2022, issued in International Patent Application No. PCT/KR2021/016320 (with English translation).
(Continued)

*Primary Examiner* — Lori Lyjak
(74) *Attorney, Agent, or Firm* — Morgan Lewis & Bockius LLP

(57)        ABSTRACT

The present invention relates to a front side member for a vehicle, which can effectively support a collision load on the front side and can improve the rigidity of a vehicle body, the front side member for a vehicle, comprising: an outer wall; an inner wall positioned to face the outer wall; an outer bead which is formed, along the lengthwise direction of a vehicle body, from the outer wall and has a first groove surface; and an inner bead which is formed, along the lengthwise direction of the vehicle body, from the inner wall and has a second groove surface, wherein the outer bead comprises an area in which a bead depth that is the distance between the outer wall and the first groove surface changes along the lengthwise direction of the vehicle body, and the inner bead comprises an area in which a bead depth that is the distance between the inner wall and the second groove surface changes along the lengthwise direction of the vehicle body.

19 Claims, 21 Drawing Sheets

(56) References Cited

U.S. PATENT DOCUMENTS

| | | |
|---|---|---|
| 2012/0306239 A1 | 12/2012 | Tamura et al. |
| 2013/0140854 A1 | 6/2013 | Mori et al. |
| 2020/0047696 A1 | 2/2020 | Atsumi et al. |

FOREIGN PATENT DOCUMENTS

| | | | |
|---|---|---|---|
| CN | 208411871 U | 1/2019 | |
| CN | 110816674 A | 2/2020 | |
| EP | 2105373 A1 | 9/2009 | |
| EP | 2554456 A1 | 2/2013 | |
| EP | 3608210 A1 | 2/2020 | |
| JP | 2004-189124 A | 7/2004 | |
| JP | 2006-207724 A | 8/2006 | |
| JP | 2007-112260 A | 5/2007 | |
| JP | 2008-007556 A | 1/2008 | |
| JP | 2008-62760 A | 3/2008 | |
| JP | 2009-227104 A | 10/2009 | |
| JP | 2010-089576 A | 4/2010 | |
| JP | 2018-075907 A | 5/2018 | |
| KR | 10-2011-0026759 A | 3/2011 | |
| KR | 10-2017-0067606 A | 6/2017 | |
| KR | 10-2020-0016782 A | 2/2020 | |
| KR | 10-2129696 B1 | 7/2020 | |
| KR | 10-2021-0150858 A | 12/2021 | |
| WO | WO-2012026028 A1 * | 3/2012 | .......... B62D 25/025 |

OTHER PUBLICATIONS

Office Action dated Jun. 6, 2025 issued in corresponding Chinese Patent Application No. 202180077870.7 with the English translation (Note: JP 2009-227104 A, JP 2007-112260 A, JP 2010-089576 A, and JP 2004-189124 A already submitted.)

Japanese Decision to Grant dated Jan. 7, 2025 issued in Japanese Patent Application No. 2023-530004 (with English translation).

The Extended European Search Report dated May 10, 2024 issued in European Patent Application No. 21894810.7.

Japanese Office Action dated Jun. 25, 2024 issued in Japanese Patent Application No. 2023-530004.

\* cited by examiner

A – A

B - B

C - C

B − B

C – C

D - D

E - E

F − F

D - D

X ⊙ ——▶ Y

D - D

FRONT SIDE MEMBER FOR VEHICLE

CROSS-REFERENCE OF RELATED APPLICATIONS

This application is the U.S. National Phase under 35 U.S.C. § 371 of International Patent Application No. PCT/KR2021/008566, filed on Jul. 6, 2021, which in turn claims the benefit of Korean Application No. 10-2020-0154868, filed on Nov. 18, 2020, the disclosures of which applications are incorporated by reference herein.

TECHNICAL FIELD

The present disclosure relates to a front side member for a vehicle constituting a front structure of a vehicle body.

BACKGROUND ART

Generally, in the front structure of a vehicle body, the front side member is disposed parallel to the longitudinal axis of the vehicle body.

In this case, for example, in a small overlap collision (when only 25% of the driver's or passenger's side of the vehicle's overall width hits an obstacle at a speed of 64 km/h), the front side member cannot exert the effect of absorbing the impact energy.

Accordingly, it is necessary to improve the shock absorbing ability of the front side member.

As related prior art, there is provided an invention disclosed in Korean Registered Patent Publication No. 2129696 B1.

SUMMARY OF INVENTION

Technical Problem

An aspect of the present disclosure is to provide a front side member for a vehicle, capable of effectively supporting a front crash load and improving the rigidity of a vehicle body.

Solution to Problem

According to an aspect of the present disclosure, a front side member for a vehicle includes an outer side wall; an inner side wall disposed opposite to the outer side wall; an outer bead formed in a longitudinal direction of a vehicle body on the outer side wall and having a first groove surface; and an inner bead formed in the longitudinal direction of the vehicle body on the inner side wall and having a second groove surface, wherein the outer bead includes a region in which a first bead depth, a distance between the outer side wall and the first groove surface, is changed in the longitudinal direction of the vehicle body, and the inner bead includes a region in which a second bead depth, a distance between the inner side wall and the second groove surface, is changed in the longitudinal direction of the vehicle body.

Advantageous Effects of Invention

According to the present disclosure, the deformation behavior of the front side member is excellent in a full frontal collision, and thus impact energy may be effectively absorbed.

In addition, according to the present disclosure, it is possible to improve the collision performance of the vehicle body by maximizing the lateral behavior of the vehicle in a small overlap collision.

BEST MODE FOR INVENTION

Figure 1:
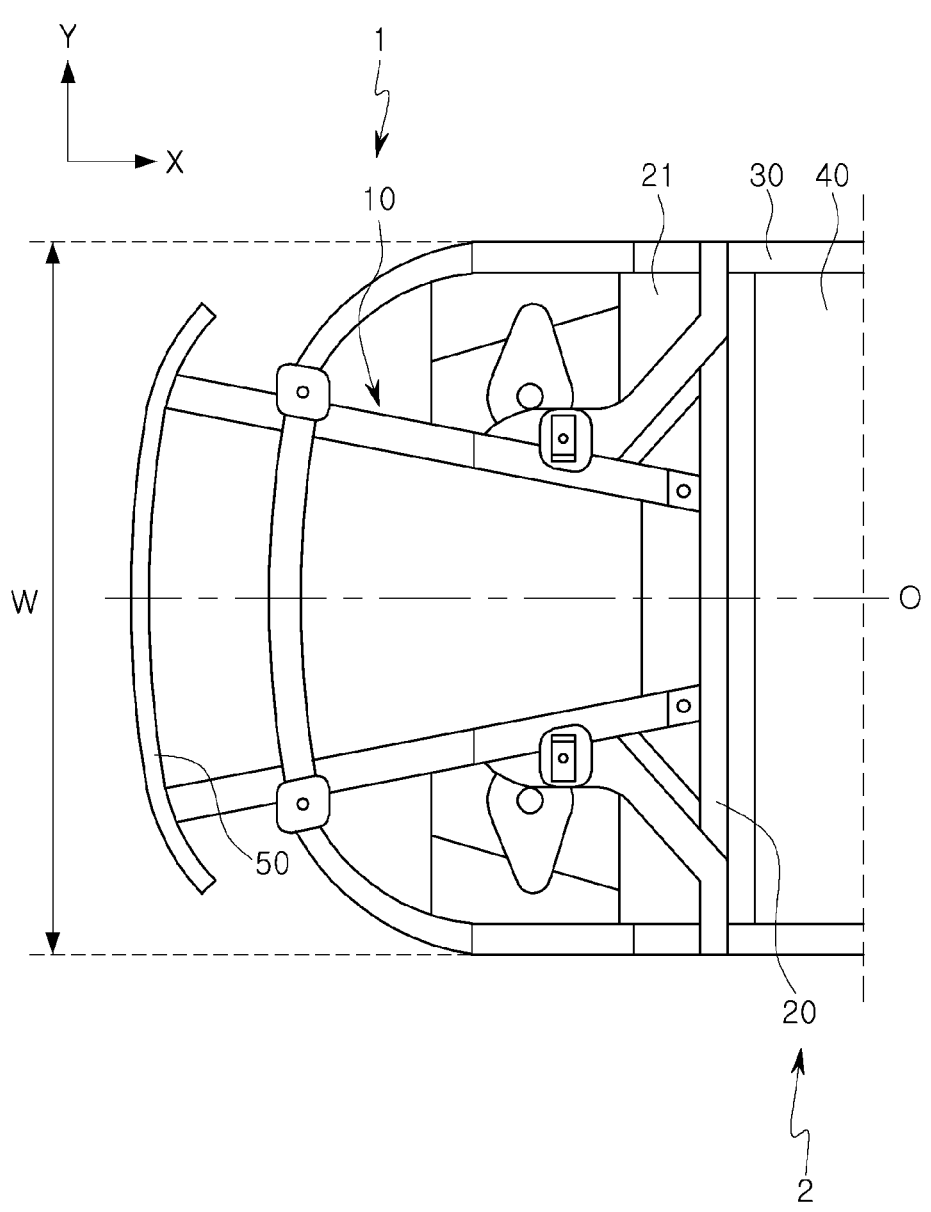
FIG. 1 is a bottom view illustrating the front structure of a vehicle body to which a front side member for a vehicle according to the present disclosure is applied.

Hereinafter, the present disclosure is explained in detail through exemplary drawings. In adding reference numerals to the components of each drawing, it should be noted that the same components have the same reference numerals as much as possible, even though they are displayed on different drawings. In addition, in describing the present disclosure, if it is determined that a detailed description of a related known configuration or function may obscure the gist of the present disclosure, the detailed description will be omitted.

Terms used in relation to directions in the description below, "forward," "front," "back," "rear," "up," "down," "left and right," "inner," "outer," "internal," "external," etc. are defined based on the vehicle or the vehicle body.

A front side member for a vehicle is composed of a front side member inner panel and a front side member outer panel. In this specification, for convenience of description, the front side member outer panel is referred to as a side outer panel, and the front side member inner panel is referred to as a side inner panel.

In the present specification, a vehicle refers to various devices that move objects to be transported, such as people, animals, or objects, from a starting point to a destination. These vehicles are not limited to those that drive on roads or tracks.

In addition, a vehicle traveling on a road or track may move in a predetermined direction according to the rotation of at least one wheel, and for example, may include three-wheeled or four-wheeled vehicles, construction machinery, two-wheeled vehicles, motor vehicles, trains running on tracks, and the like.

Figure 2:
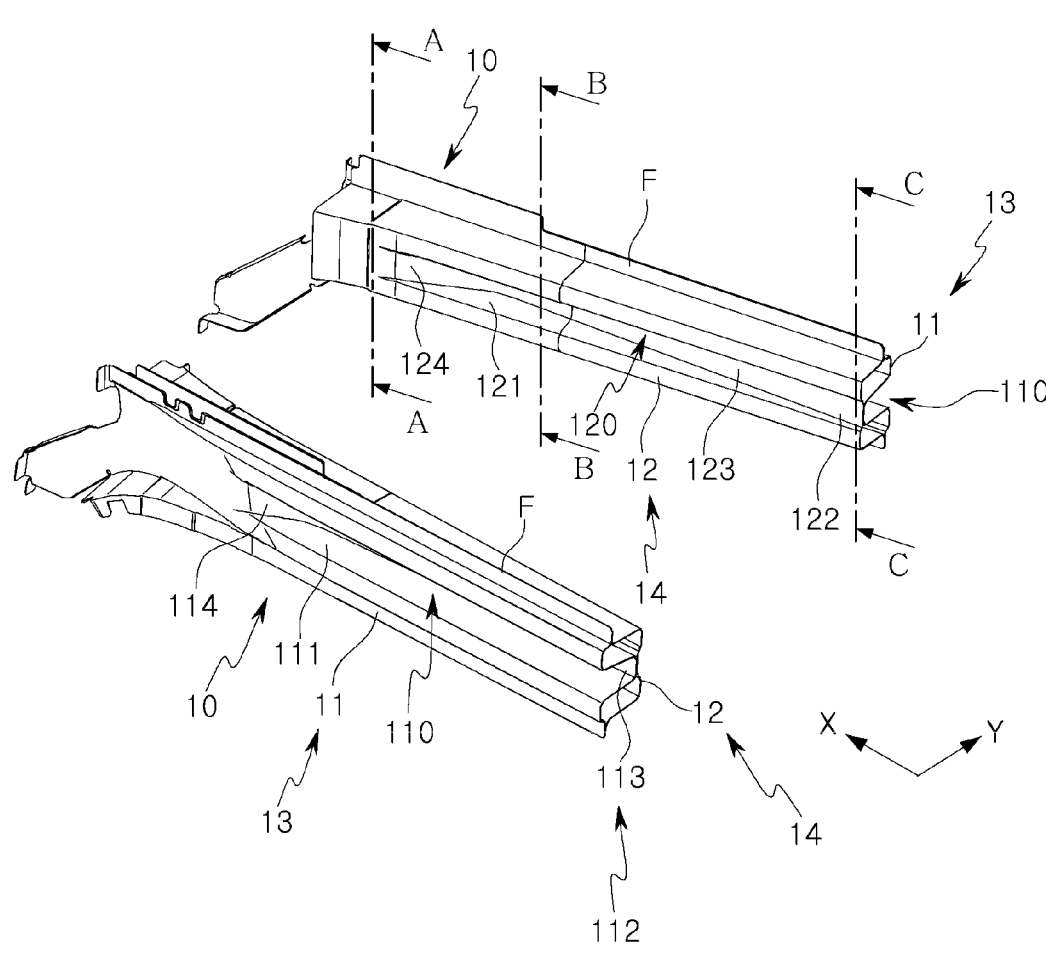
FIG. 2 is a perspective view illustrating a pair of front side members for a vehicle according to a first embodiment of the present disclosure.
Figure 3:
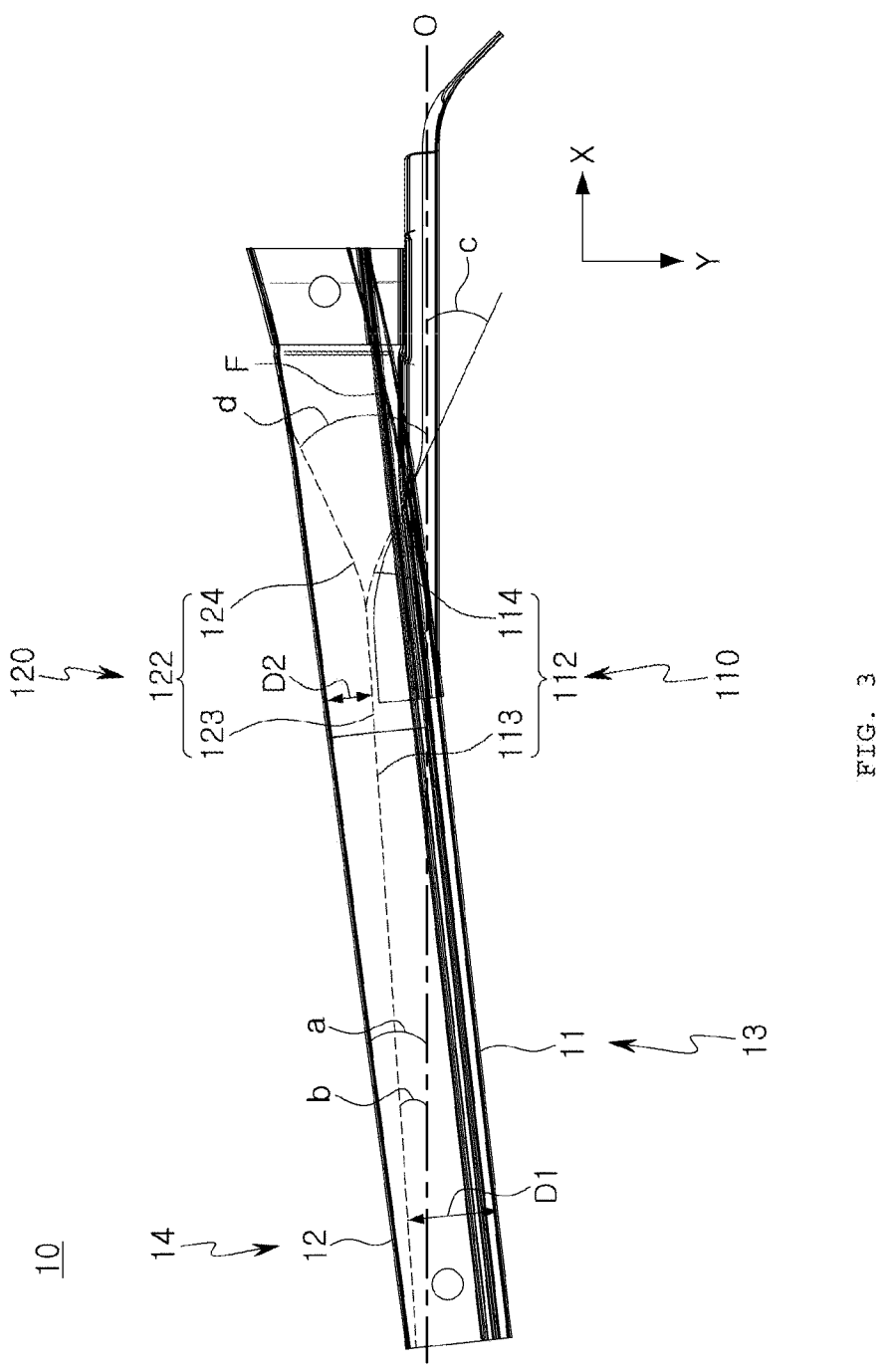
FIG. 3 is a plan view illustrating a front side member for a vehicle according to the first embodiment of the present disclosure.

FIG. 1 is a bottom view illustrating the front structure of a vehicle body to which a front side member for a vehicle according to the present disclosure is applied. FIG. 2 is a perspective view illustrating a pair of front side members for a vehicle according to a first embodiment of the present disclosure, and FIG. 3 is a plan view illustrating the front side member for a vehicle according to the first embodiment of the present disclosure.

The skeletal structure of the vehicle may be comprised of two side members 1 extending in the longitudinal direction (X) of the vehicle body and constituting the side surfaces of the vehicle body, and a cross member 2 extending in the width direction (Y) of the vehicle body and coupled to both side members.

A plurality of the cross members 2 may be coupled to the side members 1 at intervals from the front end to the rear end of the vehicle body. The side member may be referred to as a front side member 10, a rear side member, or the like, depending on the position of the cross member coupled thereof or the position of the floor panel. On the other hand, a side sill 30 may be provided on the side of the vehicle to protect the passenger space in the event of a side collision and form the exterior of the side.

For example, in the case of an electric vehicle, a battery (not illustrated) may be mounted on a vehicle body, and to this end, a battery space 40 in which the battery is mounted may be provided. A floor panel (not illustrated) may be installed above the battery space 40 to partition a passenger space in which passengers travel.

The front side members 10 for a vehicle according to first embodiment of the present disclosure are provided in pairs and extend in the longitudinal direction (X) of the vehicle body and may be disposed on both left and right sides in the width direction (Y) of the vehicle body, respectively.

For example, as illustrated in FIGS. 1 and 2, the front side member 10 may be disposed inclined to form an oblique angle rather than parallel to an axis O extending in the longitudinal direction X of the vehicle body. In more detail, the two front side members 10 may be disposed to be closer to each other toward the rear.

The inclined arrangement of the front side member 10 is because both ends of a bumper beam 50 have a curvature toward the rear so that the crash load applied to the front side members enters in an oblique line, and in this manner, by setting the angle of the front side members almost parallel to the direction of the crash load, the maximum possible crash load may be received.

In addition, the front side member 10 may be connected to the bumper beam so that one end connected to the bumper beam 50, that is, the center point of the front end is placed on a position between 20% or more and less than 30% from the outside to the inside of the entire vehicle width W.

For example, when the front side member 10 is connected to the bumper beam 50 at a position corresponding to 25% of the entire vehicle width W from the outside to the inside, in the case of a small overlap collision, the front side member may play a role in resisting the collision load.

The front side member 10 may effectively transmit a crash load applied to the front side member from the bumper beam 50 to the vehicle body via the front cross member 20 or the like.

In addition, in a small overlap collision, the front side member 10 may play a role such as drawing out the vehicle's widthwise behavior.

On the other hand, the inclined front side member 10 may have reduced crash performance compared to the parallelly disposed front side member in a 40% offset collision or a frontal total collision. The reason for this is that, in the condition of a 40% offset collision or full-frontal collision, the inclined front side member is simply buckling and deformed instead of being deformed to absorb the impact energy as much as possible.

Hereinafter, for convenience, only one of the two front side members 10 will be described. It should be noted that the other of the two front side members may be symmetrically disposed and may contain the configuration of the front side member described symmetrically.

As illustrated in FIGS. 2 and 3, the front side member 10 for a vehicle according to the first embodiment of the present disclosure may include an outer side wall 11, an inner side wall 12, an outer bead 110 and an inner bead 120.

The outer side wall 11 and the inner side wall 12 constitute the front side member 10, and may extend linearly, preferably in a straight line, in the longitudinal direction X of the vehicle body. One end of the outer side wall and the inner side wall, that is, the front end may be connected to the bumper beam 50, and the other end, that is, the rear end may be connected to the front side of the front cross member 20 or the front side of the dash panel 21 of the vehicle body extending in the width direction Y of the vehicle body.

The outer side wall 11 and the inner side wall 12 may constitute a tubular member having a cross-sectional shape of a polygon such as a quadrangular shape or the like, for example. The cross-sectional shape of the tubular member is not necessarily limited thereto. In addition, the tubular member may be formed from a single plate material, or may be formed by bonding two or more plate materials.

When the tubular member is formed by bonding two or more plate materials, the tubular member may include a side outer panel 13 and a side inner panel 14. Flanges F formed by bending may be provided at upper and lower ends of the side outer panel and the side inner panel, respectively.

By welding and coupling the side inner panel 14 to one side of the side outer panel 13, a tubular member having a closed cross section may be made. Between the side outer panel and the side inner panel, welding such as spot welding or laser welding may be applied to an applicable portion including the flange F to be coupled.

Accordingly, the outer side wall 11 may be provided on the side outer panel 13 and the inner side wall 12 may be provided on the side inner panel 14.

In the front side member 10 for a vehicle according to the first embodiment of the present disclosure, the outer side wall 11 and the inner side wall 12 may be inclined at a first angle (a) with respect to the longitudinal axis O of the vehicle body due to the inclined arrangement of the front side member. The first angle has a range of approximately 5 to 10 degrees.

The outer bead 110 may be formed to extend in the longitudinal direction X of the vehicle body from the outer side wall 11. For example, the outer bead may have a length extending equal to or more than half the length of the outer side wall from the front end toward the rear end of the outer side wall.

The inner bead 120 may be formed to extend in the longitudinal direction X of the vehicle body from the inner side wall 12. For example, the inner bead may have a length extending equal to or more than half the length of the inner side wall from the front end toward the rear end of the inner side wall.

Figure 4:
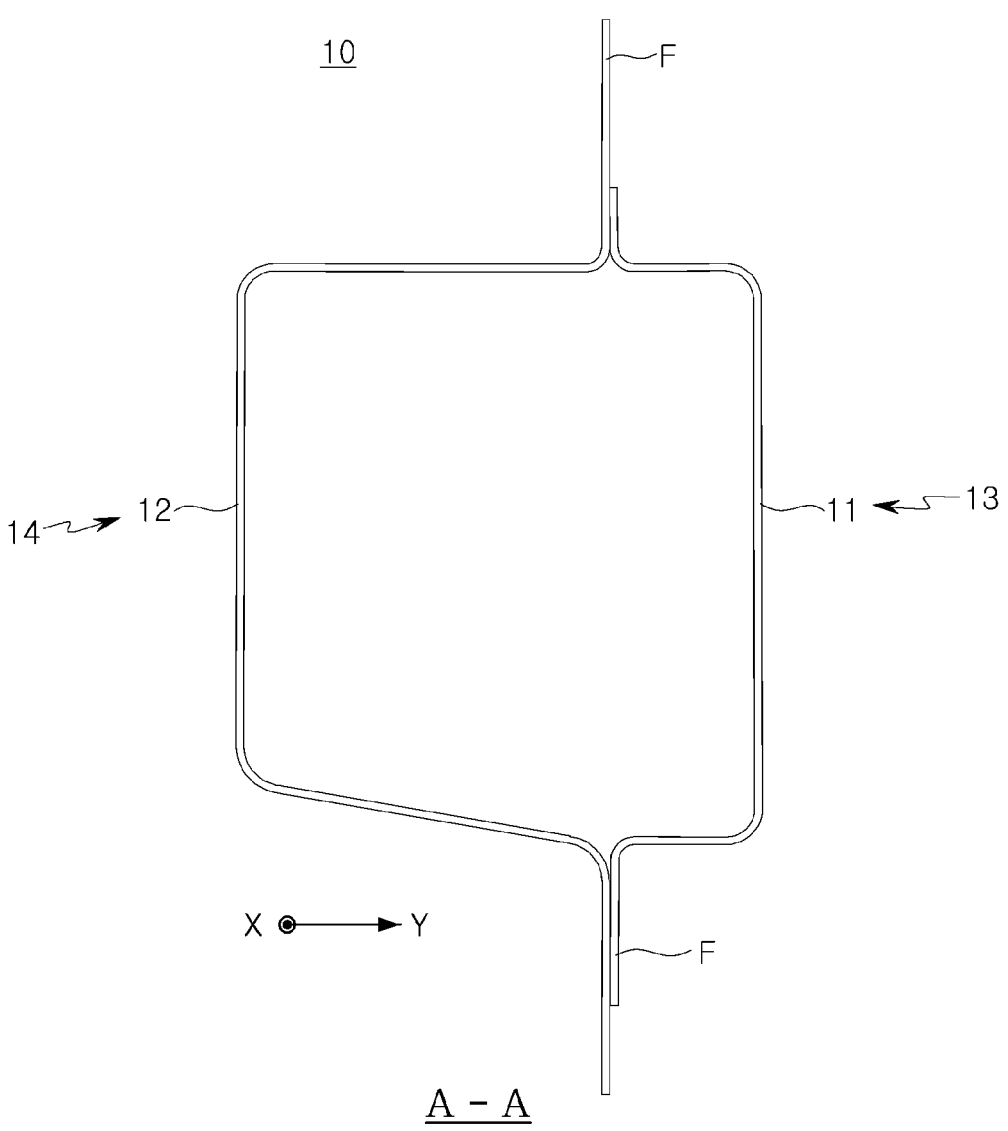
FIG. 4 is a cross-sectional view taken along line A-A of FIG. 2.
Figure 5:
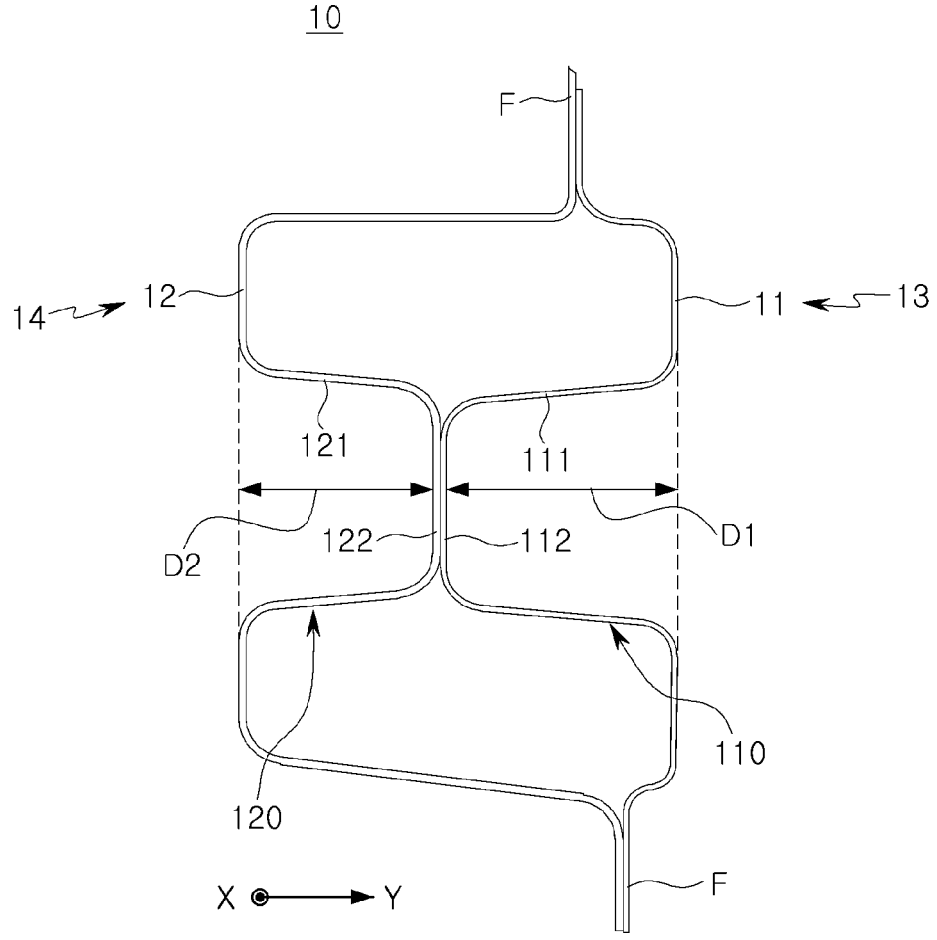
FIG. 5 is a cross-sectional view taken along line B-B of FIG. 2.
Figure 6:
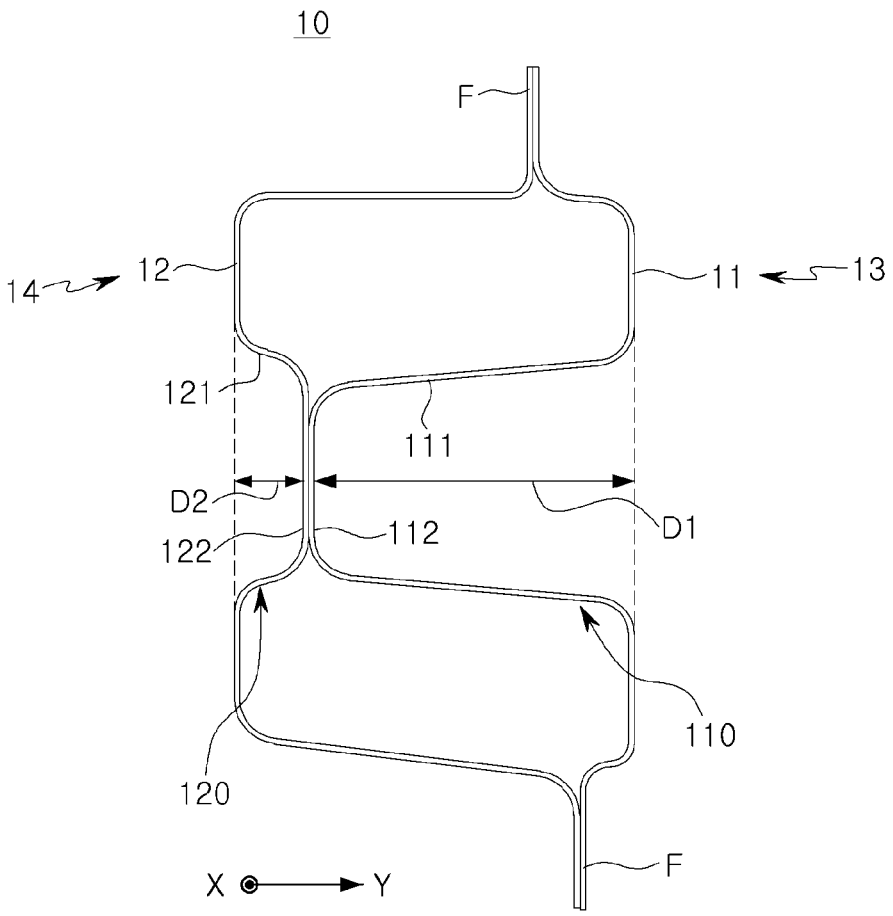
FIG. 6 is a cross-sectional view taken along line C-C of FIG. 2.

FIG. 4 is a cross-sectional view taken along line A-A of FIG. 2, FIG. 5 is a cross-sectional view taken along line B-B of FIG. 2, and FIG. 6 is a cross-sectional view taken along line C-C of FIG. 2.

Referring to FIGS. 4 to 6, the outer bead 110 may include a first groove surface 112 connecting between groove walls 111. In addition, the outer bead may have a first bead depth D1 equal to a distance between the outer side wall 11 and the first groove surface.

The inner bead 120 may include a second groove surface 122 connecting between groove walls 121. In addition, the inner bead may have a second bead depth D2 equal to a distance between the inner side wall 12 and the second groove surface.

Referring to FIGS. 4 to 6 together with FIG. 3, in the front side member 10 for a vehicle according to the first embodiment of the present disclosure, the outer bead 110 may include a region in which the first bead depth D1 is changed in the longitudinal direction X of the vehicle body.

In the front side member 10 for a vehicle according to the first embodiment of the present disclosure, the inner bead 120 may include a region in which the second bead depth D2 is changed in the longitudinal direction X of the vehicle body.

Accordingly, the first groove surface 112 of the outer bead 110 may include a first inclined surface 113 inclined at a second angle b with respect to the longitudinal axis O of the vehicle body. Further, the first groove surface of the outer bead may include a second inclined surface 114 inclined at a third angle (c) with respect to the longitudinal axis of the vehicle body. Here, the third angle (c) may be greater than the second angle (b) and the first angle (a).

The second groove surface 122 of the inner bead 120 may include a third inclined surface 123 inclined at a second angle b with respect to the longitudinal axis O of the vehicle body. Also, the second groove surface of the inner bead may include a fourth inclined surface 124 inclined at a fourth angle d with respect to the longitudinal axis of the vehicle body. Here, the fourth angle (d) may be greater than the second angle (b) and the first angle (a).

The second angle (b) between the first inclined surface 113 of the outer bead 110 and the third inclined surface 123 of the inner bead 120 has a range of approximately 0 to 3 degrees. Thereby, the first inclined surface of the outer bead and the third inclined surface of the inner bead may be disposed parallel or almost parallel to the longitudinal axis O of the vehicle body.

The second angle b that the outer bead 110 and the inner bead 120 have with respect to the longitudinal axis O of the vehicle body may be less than the first angle (a) that the outer side wall 11 and the inner side wall 12 have with respect to the longitudinal axis (O) of the vehicle body due to the inclined arrangement of the front side member 10.

Because of this configuration, in the front side member 10 for a vehicle according to the first embodiment of the present disclosure, for example, as illustrated in FIG. 4, the outer side wall 11 and the inner side wall 12 may form a closed-cross section without beads on the rear end.

Then, for example, as illustrated in FIG. 5, the front side member 10 has a second bead depth D2 of the inner bead 120 and a first bead depth D1 of the outer bead 110, which are the same as each other, or has the second bead depth formed deeper than the first bead depth, on the middle.

Then, for example, as illustrated in FIG. 6, in the front side member 10, the second bead depth D2 of the inner bead 120 gradually becomes shallower towards the front end, while the outer bead 110 has the first bead depth D1 that may be formed gradually deeper.

In other words, the first bead depth D1 of the outer bead 110 may gradually increase toward the front of the vehicle body. Conversely, the second bead depth D2 of the inner bead 120 from the third inclined surface 123 may gradually become shallower toward the front of the vehicle body.

In the front side member 10 for a vehicle according to the first embodiment of the present disclosure, the first groove surface 112 of the outer bead 110 and the second groove surface 122 of the inner bead 120 may contact each other. In detail, the first inclined surface 113 of the outer bead and the third inclined surface 123 of the inner bead may contact each other.

A welded part or an adhesive layer may be formed between the first groove surface 112 and the second groove surface 122 in contact with each other. The welded part may be formed by welding such as spot welding, laser welding, or the like. The adhesive layer may be formed by an adhesive such as a structural adhesive or the like.

However, it is not necessarily limited thereto, and for example, the first groove surface 112 and the second groove surface 122 may simply face each other without welding or an adhesive layer, or may be coupled with rivets or the like.

The tubular member or the side outer panel 13 and the side inner panel 14 may be made of a metal material such as steel, for example, and may be molded together with the outer bead 110 and the inner bead 120 by forming or bending using a press, roll forming, or combinations thereof.

In more detail, for example, the side outer panel 13 and the side inner panel 14 are made of plates such as 980 DP (Dual Phase) steel, 980 XF (Extra Formability) steel, 1180 TRIP (Transformation Induced Plasticity) steel, or the like with a thickness of about 1.2 mm to 2.0 mm produced by the present applicant.

Here, 980 DP steel is a steel grade having a tensile strength of 980 MPa or more and a low yield ratio, to be easily processed and exert a high elongation. 980 XF steel is a steel grade having a tensile strength of 980 MPa or higher and a yield strength of 600 MPa or higher, and exhibiting high elongation. 1180 TRIP steel is a steel grade guaranteeing tensile strength of 1180 MPa or higher and yield strength of 850 MPa or higher and having elongation improved to 45% or higher.

For example, any one of 980 DP steel, 980 XF steel, or 1180 TRIP steel may be used alone or in combination in the side outer panel 13 and the side inner panel 14. In this manner, through a combination of the strengths of the plates forming the front side members 10, the shock absorption capability of the front side member may be maximized.

When the side outer panel 13 and the side inner panel 14 are manufactured by roll forming, even ultra-high strength steel having a tensile strength of about 590 MPa or more may be formed without difficulty. Moreover, in roll forming, compared to press forming, it is easy to compensate for spring back and has the advantage of being able to reduce the corner radius of the side outer panel and the side inner panel.

On the other hand, when the tubular member is formed of a single plate material, the front side member 10 may be formed together with the outer bead 110 and the inner bead 120 through hydroforming or arbitrary machining.

When the front side member 10 is formed by hydroforming, even ultra-high-strength steel having a tensile strength of about 590 MPa or more may be formed without difficulty. Moreover, it is possible to secure additional weight reduction by applying ultra-high-strength steel.

In addition, when hydroforming is applied to steel, it is possible to reduce manufacturing costs due to the reduction of welding man-hours and the like during parts production, and at the same time, it is possible to drastically reduce the material cost compared to aluminum through the use of steel.

In the front side member 10 for a vehicle according to the first embodiment of the present disclosure, first, the outer bead 110 of the outer side wall 11 and the inner bead 120 of the inner side wall 12 are formed, so that the stiffness of the vehicle body or the front side member in the longitudinal direction (X) may be improved, thereby increasing the absorbable load.

In addition, the front side member 10 for a vehicle according to the first embodiment of the present disclosure may transfer the crash load to the rear of the vehicle body in a small overlap collision as well as in a frontal overall collision due to the inclined arrangement thereof, and in the event of a small overlap collision, the vehicle's widthwise behavior may be derived, and thus the collision performance of the vehicle body may be improved.

For example, in the case of an electric vehicle, even though the weight of the vehicle increases due to the mounting of the battery and the space of the vehicle body is reduced, there is an advantage of securing crash performance and safety. This may lead to improvement in the marketability of the vehicle.

Figure 7:
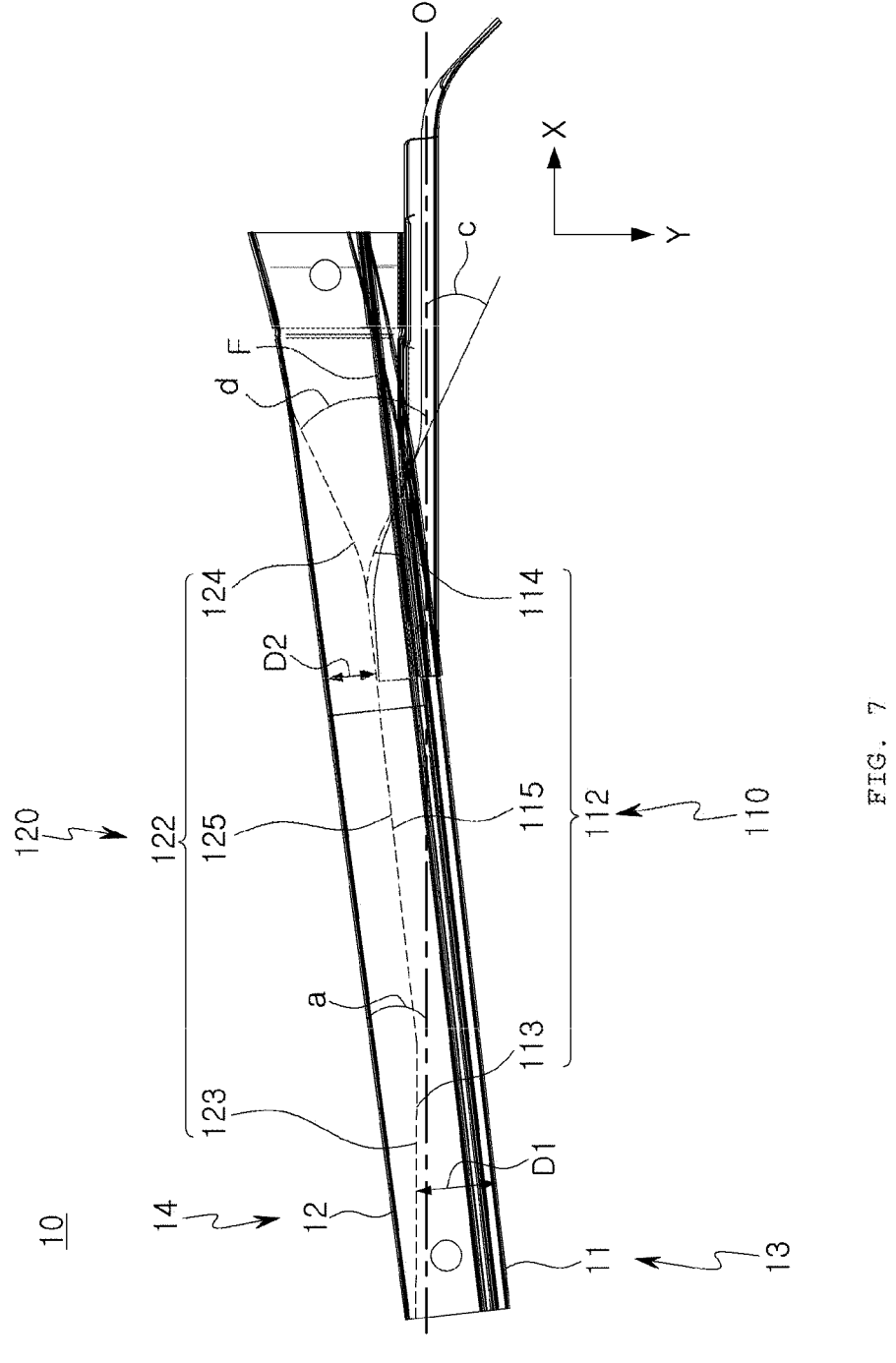
FIG. 7 is a plan view illustrating a front side member for a vehicle according to a second embodiment of the present disclosure.

FIG. 7 is a plan view illustrating a front side member for a vehicle according to a second embodiment of the present disclosure.

In the second embodiment of the present disclosure illustrated in FIG. 7, only the shape of the first groove surface 112 of the outer bead 110 and the second groove surface 122 of the inner bead 120 are different, and the remaining components are the same as the components of the first embodiment described above. Accordingly, in describing the front side member 10 for a vehicle according to the second embodiment of the present disclosure, the same reference numerals are given to the same components as those of the front side member for a vehicle according to the first embodiment described above, and a detailed description of the configuration and function thereof will be omitted.

In the front side member 10 for a vehicle according to the second embodiment of the present disclosure, the outer bead 110 may include a region in which the first bead depth D1 varies in the longitudinal direction X of the vehicle body.

In the front side member 10 for a vehicle according to the second embodiment of the present disclosure, the inner bead 120 may include a region where the second bead depth D2 varies in the longitudinal direction of the vehicle body.

Accordingly, the first groove surface 112 of the outer bead 110 may include a first inclined surface 113 inclined at a second angle b with respect to the longitudinal axis O of the vehicle body. Further, the first groove surface of the outer bead may include a second inclined surface 114 inclined at a third angle c with respect to the longitudinal axis of the vehicle body. Here, the third angle (c) may be greater than the second angle (b) and the first angle (a).

The first groove surface 112 of the outer bead 110 may further include a first connection surface 115 connecting the first inclined surface 113 and the second inclined surface 114. The first connection surface extends parallel to the outer side wall in the longitudinal direction X of the vehicle body within the outer bead.

The second groove surface 122 of the inner bead 120 may include a third inclined surface 123 inclined at a second angle b with respect to the longitudinal axis O of the vehicle body. Also, the second groove surface of the inner bead may include a fourth inclined surface 124 inclined at a fourth angle d with respect to the longitudinal axis of the vehicle body. Here, the fourth angle (d) may be greater than the second angle (b) and the first angle (a).

The second groove surface 122 of the inner bead 120 may further include a second connection surface 125 connecting the third inclined surface 123 and the fourth inclined surface 124. The second connection surface extends within the inner bead parallel to the inner side wall in the longitudinal direction X of the vehicle body.

The second angle (b) between the first inclined surface 113 of the outer bead 110 and the third inclined surface 123 of the inner bead 120 has a range of approximately 0 to 3 degrees. In FIG. 7, the second angle b is omitted as it is almost 0 degrees. Thereby, the first inclined surface of the outer bead and the third inclined surface of the inner bead may be disposed parallel or almost parallel to the longitudinal axis O of the vehicle body.

The second angle b of the outer bead 110 and the inner bead 120 with respect to the longitudinal axis O of the vehicle body may be less than a first angle (a) that the outer side wall 11 and the inner side wall 12 have with respect to the longitudinal axis of the vehicle body, due to the inclined arrangement of the front side member 10.

As such, since the outer bead 110 and the inner bead 120 each include a region in which the bead depth is changed in the longitudinal direction X of the vehicle body, in the front side member 10 for a vehicle according to the second embodiment of the present disclosure, the first bead depth D1 of the outer bead may increase from the connection point between the first connection surface 115 and the first inclined surface 113 toward the front of the vehicle body. Conversely, the second bead depth D2 of the inner bead may become shallower toward the front of the vehicle body from the connection point between the second connection surface 125 and the third inclined surface 123.

In the front side member 10 for a vehicle according to the second embodiment of the present disclosure, the first groove surface 112 of the outer bead 110 and the second groove surface 122 of the inner bead 120 may contact each other. In detail, the first inclined surface 113 of the outer bead and the third inclined surface 123 of the inner bead may contact each other, and the first connection surface 115 of the outer bead and the second connection surface 125 of the inner bead may contact each other.

A welded part or an adhesive layer may be formed between the first groove surface 112 and the second groove surface 122 in contact with each other. The welded part may be formed by welding such as spot welding, laser welding, or the like. The adhesive layer may be formed by an adhesive such as a structural adhesive or the like.

However, it is not necessarily limited thereto, and for example, the first groove surface 112 and the second groove surface 122 may simply face each other without welding or an adhesive layer, or may be coupled with rivets or the like.

Figure 8:
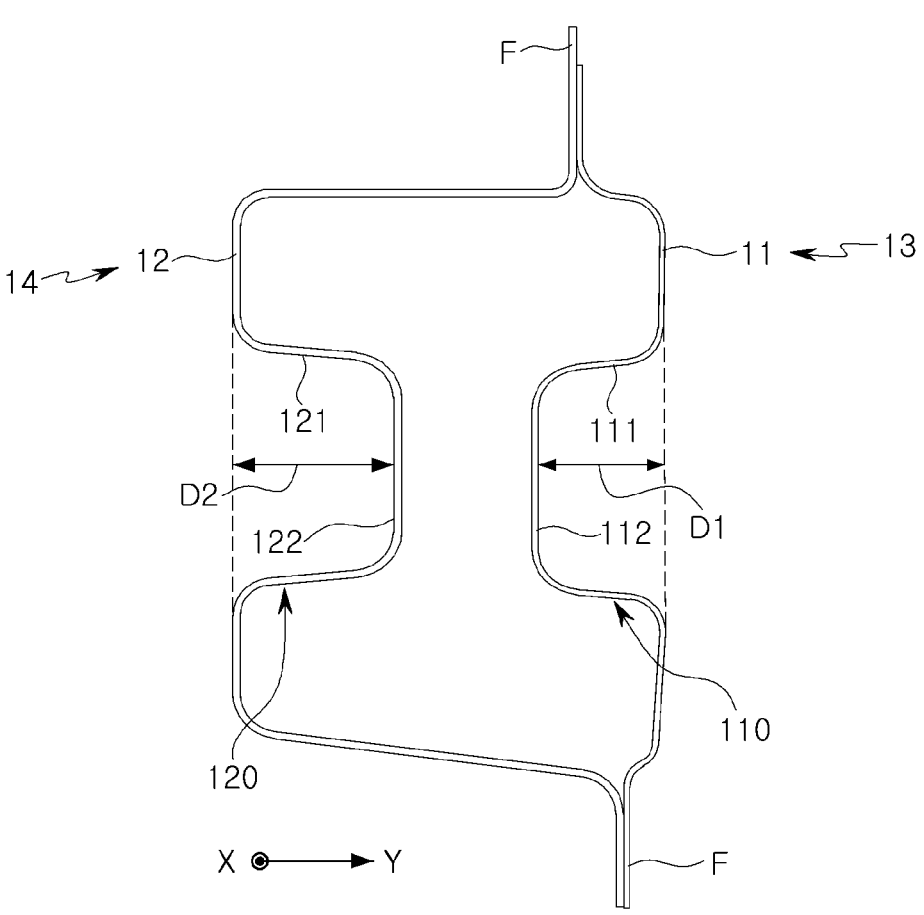
FIG. 8 is a cross-sectional view illustrating a front side member for a vehicle according to a third embodiment of the present disclosure, and is a view of a portion corresponding to FIG. 5.
Figure 9:
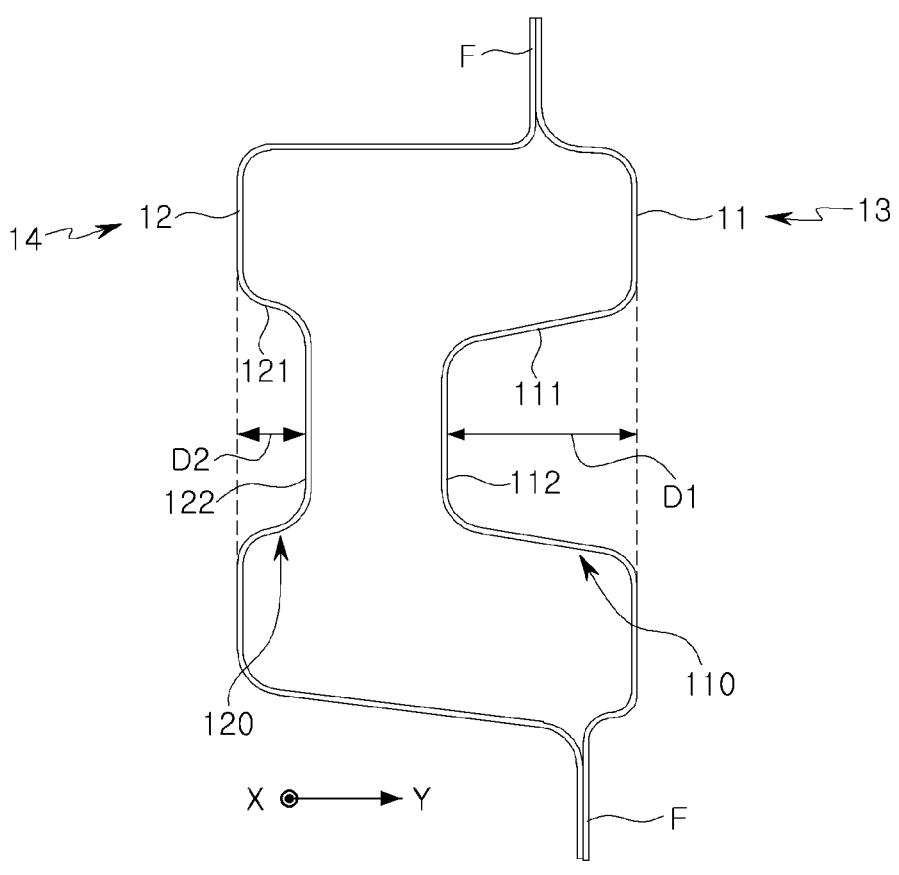
FIG. 9 is a cross-sectional view illustrating a front side member for a vehicle according to the third embodiment of the present disclosure, and is a view of a portion corresponding to FIG. 6.

FIG. 8 is a cross-sectional view illustrating a front side member for a vehicle according to a third embodiment of the present disclosure, and is a view of a portion corresponding to FIG. 5. FIG. 9 is a cross-sectional view illustrating a front side member for a vehicle according to the third embodiment of the present disclosure, and is a view of a portion corresponding to FIG. 6.

The third embodiment of the present disclosure illustrated in FIGS. 8 and 9 differs only in that the first groove surface 112 of the outer bead 110 and the second groove surface 122 of the inner bead 120 are spaced apart from each other, and the rest of the components are the same as those of the first or second embodiment described above. Therefore, in describing the front side member 10 for a vehicle according to the third embodiment of the present disclosure, the same reference numerals are given to the same elements as those of the front side member for a vehicle according to the first or second embodiment, and detailed descriptions of the configuration and functions will be omitted.

In the front side member 10 for a vehicle according to the third embodiment of the present disclosure, the first groove surface 112 of the outer bead 110 and the second groove surface 122 of the inner bead 120 may be spaced apart from each other. In detail, the first inclined surface 113 of the outer bead and the third inclined surface 123 of the inner bead may be formed and disposed to be spaced apart from each other at regular intervals.

Alternatively, the first connection surface 115 of the outer bead 110 and the second connection surface 125 of the inner bead 120 may be formed and disposed spaced apart from each other at regular intervals.

In this manner, due to the first groove surface 112 of the outer bead 110 and the second groove surface 122 of the inner bead 120, which are spaced apparat from each other, the outer bead and the inner bead may not be deeply molded. Accordingly, it is easy to mold the outer bead and the inner bead, and man-hours and costs of welding, bonding, or riveting for coupling the groove surfaces may be reduced.

Of course, even if the first groove surface 112 of the outer bead 110 and the second groove surface 122 of the inner bead 120 are separated in this manner, the outer bead and the inner bead act as reinforcing means within the front side member 10, and as a result, the front side members may effectively resist frontal impacts applied from the outside.

Figure 10:
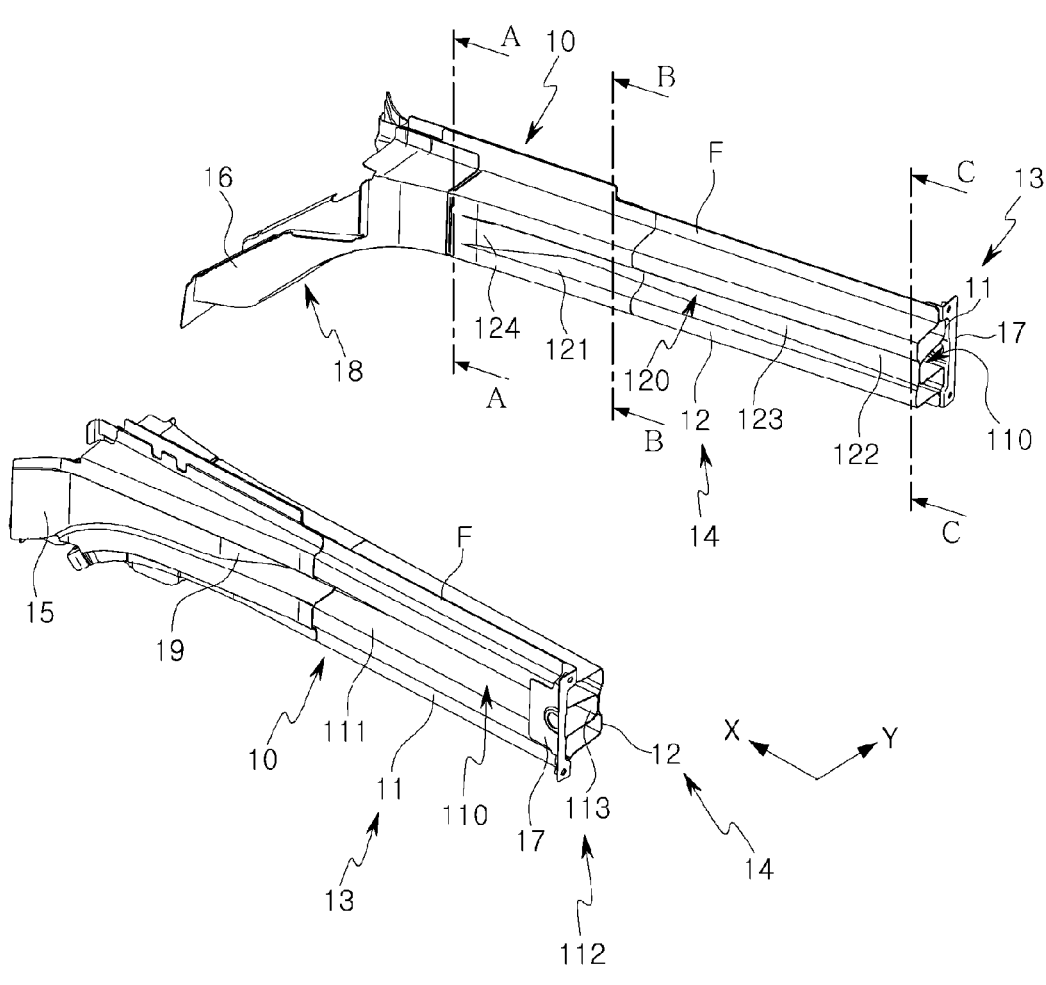
FIG. 10 is a perspective view illustrating a pair of front side members for a vehicle according to a fourth embodiment of the present disclosure.
Figure 11:
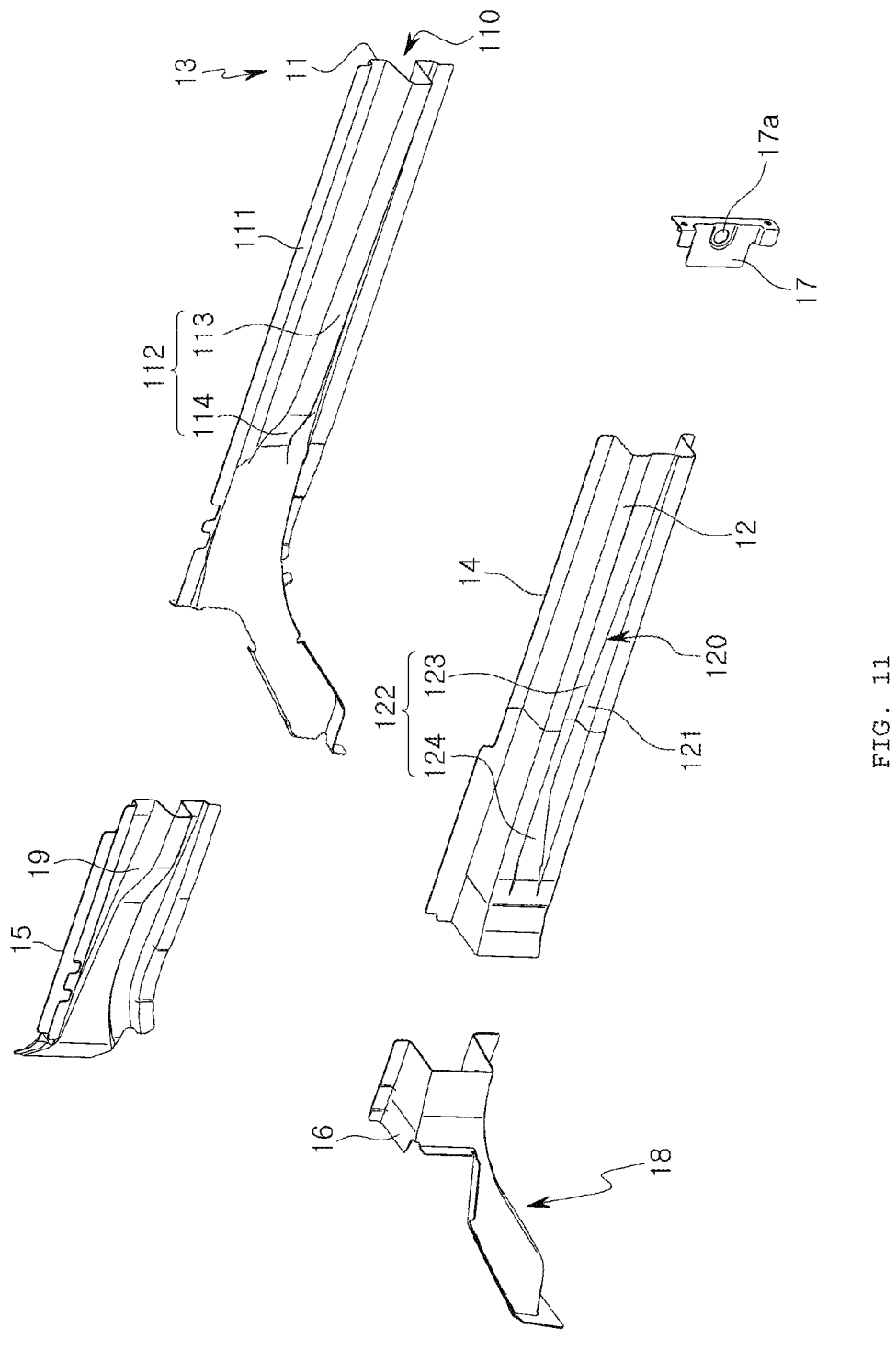
FIG. 11 is an exploded perspective view of a front side member for a vehicle according to the fourth embodiment of the present disclosure.
Figure 12:
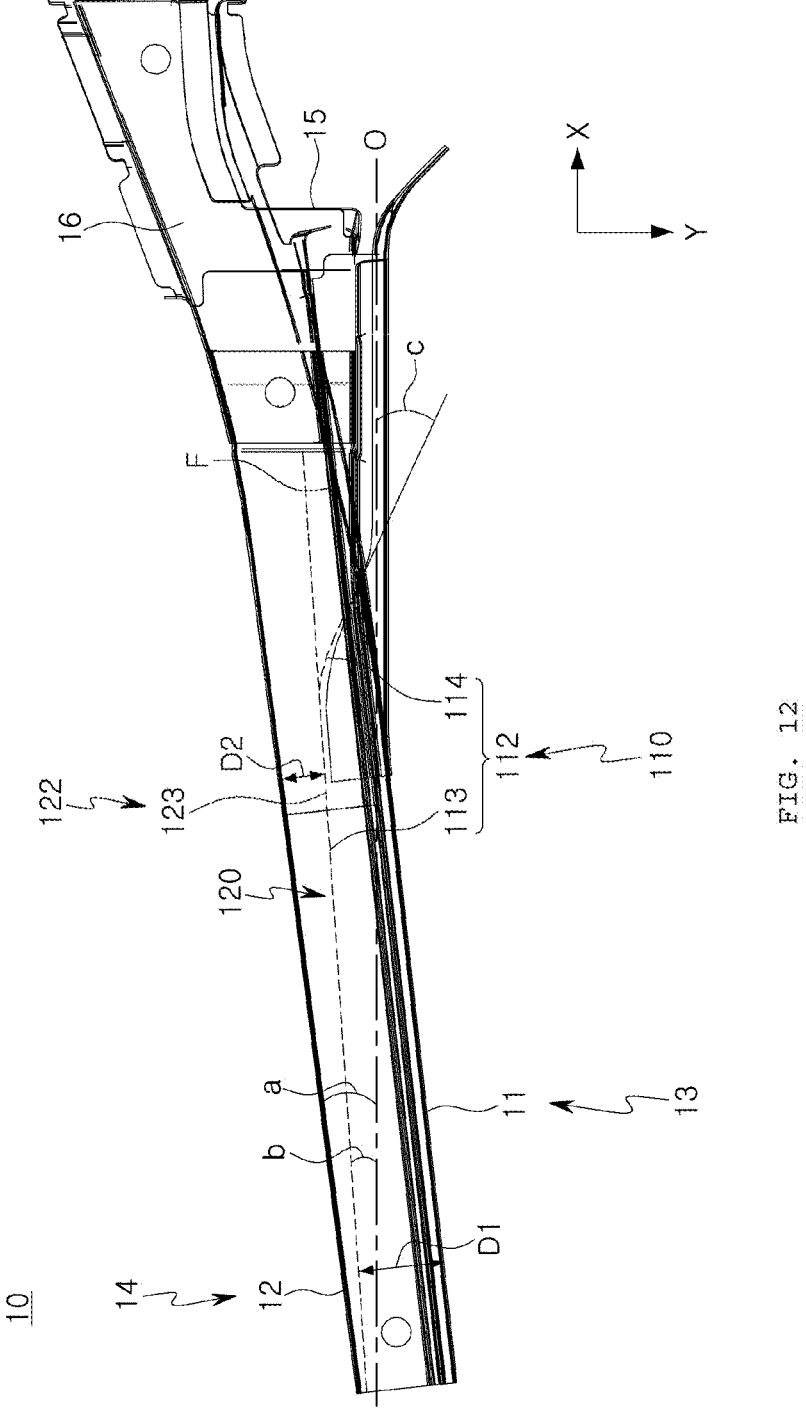
FIG. 12 is a plan view illustrating a front side member for a vehicle according to the fourth embodiment of the present disclosure.

FIG. 10 is a perspective view illustrating a pair of front side members for a vehicle according to a fourth embodiment of the present disclosure, and FIG. 11 is an exploded perspective view of a front side member for a vehicle according to the fourth embodiment of the present disclosure. FIG. 12 is a plan view illustrating a front side member for a vehicle according to the fourth embodiment of the present disclosure.

As illustrated in FIGS. 10 to 12, a front side member 10 for a vehicle according to the fourth embodiment of the present disclosure may include an outer side wall 11, an inner side wall 12, an outer bead 110, an inner bead 120, an outer rear 15, an inner rear 16, and a reinforcing member 17.

The outer side wall 11 and the inner side wall 12 constitute the front side member 10, and may extend linearly, preferably in a straight line, in the longitudinal direction X of the vehicle body. One end of the outer side wall and the inner side wall, that is, the front end may be connected to the bumper beam 50 (see FIG. 1), and the other end, that is, the rear end may be connected to the outer rear 15 or the inner rear 16, or the outer rear and the inner rear.

The outer side wall 11 and the inner side wall 12 may constitute a tubular member having a cross-sectional shape of a polygon such as a quadrangular shape or the like, for example. The cross-sectional shape of the tubular member is not necessarily limited thereto. In addition, the tubular member may be formed from a single plate material, or may be formed by bonding two or more plate materials.

Hereinafter, for convenience of description and illustration, the front side member 10 for a vehicle according to the fourth embodiment of the present disclosure will be mainly described in the case where the tubular member is formed by bonding two or more plate materials. Even when the tubular member is formed from a single plate material, the same configuration and coupling relationship may be applied.

The tubular member may include a side outer panel 13 and a side inner panel 14. Flanges F formed by bending may be provided on upper and lower ends of the side outer panel and the side inner panel, respectively.

By welding and coupling the side inner panel 14 to one side of the side outer panel 13, a tubular member having a closed cross section may be made. The side outer panel and the side inner panel may be coupled by applying welding such as spot welding, laser welding or the like to an applicable portion including the flange F.

Accordingly, the outer side wall 11 may be provided on the side outer panel 13, and the inner side wall 12 may be provided on the side inner panel 14.

The outer rear 15 may be coupled to branch and extend from the rear end of the side outer panel 13 in a direction different from the extending direction of the side outer panel. The front portion of the outer rear extends parallel to the side outer panels by a predetermined length, and the rear portion may be bent or curved at a predetermined angle with respect to the front portion.

Accordingly, in the front end of the outer rear 15, one side may be fixed to the side of the side outer panel 13 or the flange (F) of the outer rear may be fixed to the flange of the side outer panel, for example, by welding such as spot welding, laser welding, or the like. However, it is not necessarily limited thereto, and for example, the outer rear may be continuously and integrally molded with the side outer panels to extend linearly, following the side outer panels.

The outer rear 15 may be formed separately using mechanical processing, such as stamping, roll forming or the like, or may be integrally formed when the side outer panels 13 are formed.

An auxiliary bead 19 may be formed on the front portion of the outer rear 15 in a shape corresponding to a portion of the outer bead 110 of the outer side wall 11. The auxiliary bead may reinforce the rigidity of the side outer panel 13 as well as the outer rear, and enables the outer rear to be stably coupled to the outer side wall or the side outer panel.

A rear end of the outer rear 15 may be connected to a side sill 30 (see FIG. 1) extending in the longitudinal direction X of the vehicle body and a front cross member 20 (see FIG. 1). As a result, the front side member 10 may reliably transmit the crash load to the side sill and the front cross member through the outer rear.

The inner rear 16 may extend from the rear end of the side inner panel 14. The inner rear may have a cross-sectional shape that is bent or curved to have an open cross-section.

Accordingly, one side of the front end of the inner rear 16 may be fixed to the side of the side inner panel 14 by welding such as spot welding, laser welding or the like. However, it is not necessarily limited thereto, and for example, the inner rear may be continuously and integrally molded with the side inner panel to extend linearly following the side inner panel.

The inner rear 16 may be formed separately using mechanical processing such as stamping, roll forming or the like, or integrally formed when the side inner panels 14 are formed.

The rear end of the inner rear 16 may be connected to the front surface of the front cross member 20 (see FIG. 1) extending in the width direction Y of the vehicle body and the front surface of the dash panel 21.

Further, the rear portion of the inner rear 16 may be bent downward, thereby forming a curved portion 18. For example, the curved portion may be in contact with the front surface of the dash panel 21, and one side of an end portion of the curved portion may be in surface contact with the front surface of the front cross member 20, and may be fixed by, for example, welding or the like. In this manner, the front side member 10 may reliably transmit the crash load to at least the front cross member via the inner rear.

In the front side member 10 for a vehicle according to the fourth embodiment of the present disclosure, through the adjustment of the material of the plate material constituting the outer rear 15 and the inner rear 16 and the strength of this material, the collision performance of the front side member may be secured. For example, by employing ultra-high strength steel of 980 MPa or higher, an optimal combination for rigidity and light weight of the front side member may be obtained.

In more detail, the outer rear 15 and the inner rear 16 may be made of a plate material such as 1470 Hot Press Forming (HPF) steel produced by the present applicant. Here, 1470 HPF steel is a type of steel that may freely form the shape of a part while obtaining a tensile strength of 1,470 MPa or more.

The outer rear 15 may be formed of a material having a higher strength than the strength of the outer side wall 11. The inner rear 16 may be formed of a material having a higher strength than the strength of the inner side wall 12.

In this manner, through a combination of the strengths of the plates forming the front side member 10, the shock absorption capability of the front side member may be maximized.

Also, the outer rear 15 may be formed to be thicker than the thickness of the outer side wall 11. The inner rear 16 may be formed thicker than the thickness of the inner side wall 12.

As described above, the outer rear 15 and the inner rear 16, which are relatively thicker than the outer side wall 11 and the inner side wall 12, may strengthen the support rigidity of the front side member 10 itself in the event of a frontal collision of a vehicle. Accordingly, the outer rear and inner rear may maximize the shock absorption capability of the front side member.

On the other hand, since a subframe (not illustrated) of a suspension may be fastened to the front end of the front side member 10, the front end of the front side member may be vulnerable to a vertical load. Accordingly, the reinforcing member 17 may be selectively mounted on the front end of the outer side wall 11.

The reinforcing member 17 may be connected to the bumper beam 50 together with the outer side wall. In addition, at least one through-hole 17a for welding may be formed in the reinforcing member. Through the through-hole for welding, for example, a spot welder or the like penetrates, and welding may be performed between the first groove surface 112 of the outer bead 110 and the second groove surface 122 of the inner bead 120, which will be described later.

Figure 13:
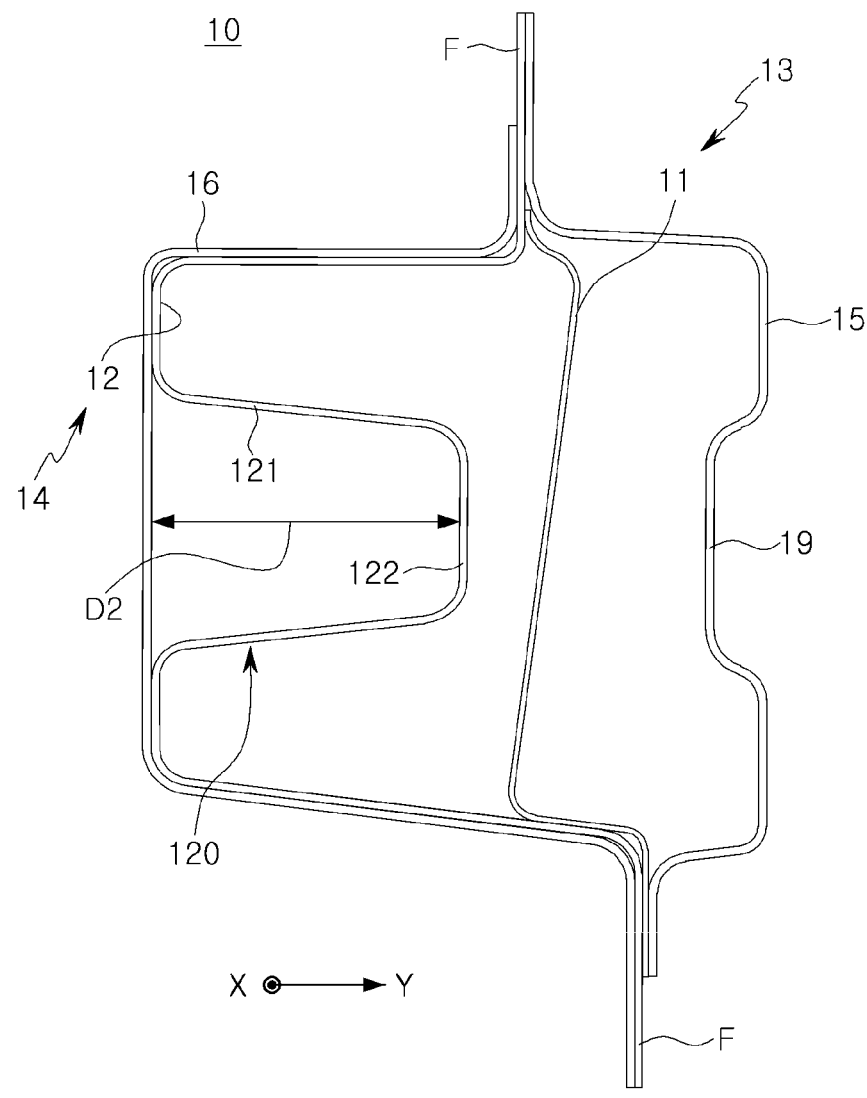
FIG. 13 is a cross-sectional view taken along line D-D of FIG. 10.
Figure 14:
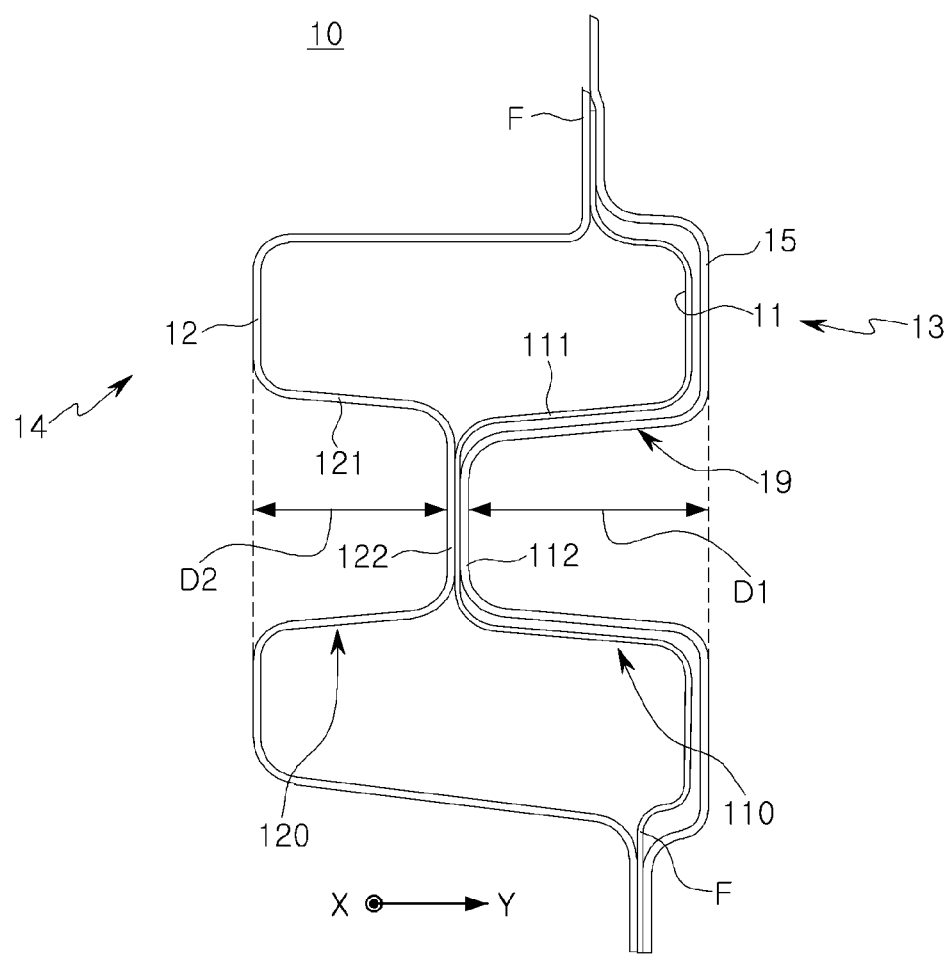
FIG. 14 is a cross-sectional view taken along line E-E of FIG. 10.
Figure 15:
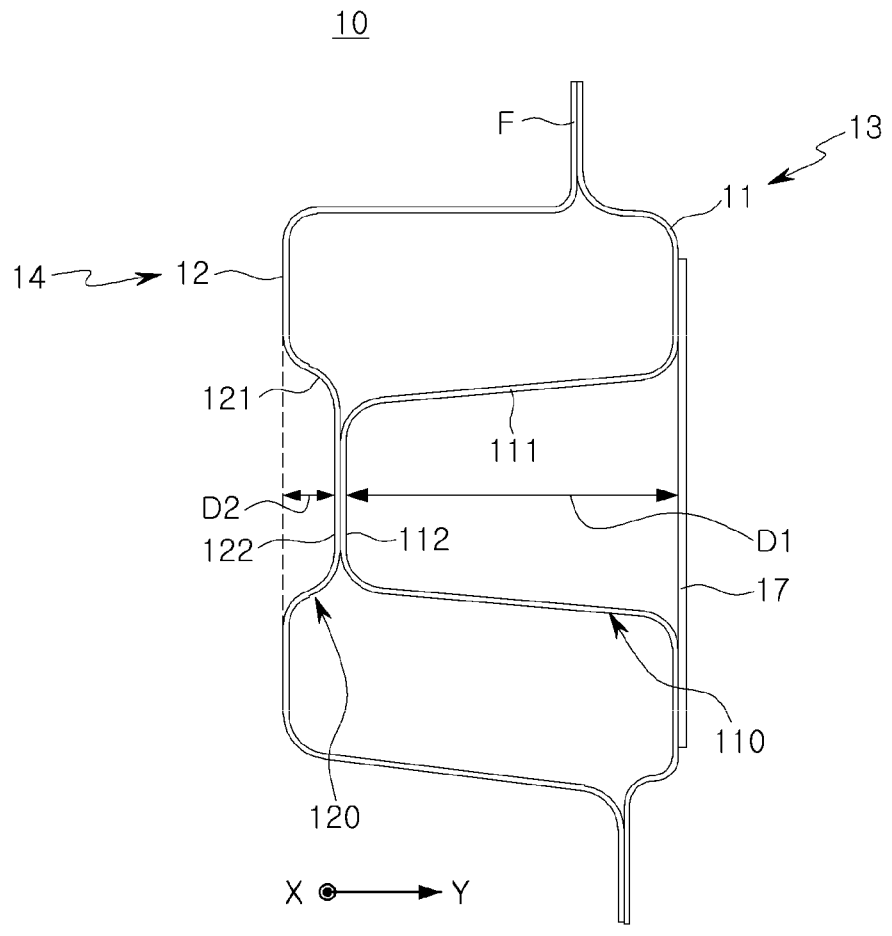
FIG. 15 is a cross-sectional view taken along line F-F of FIG. 10.

FIG. 13 is a cross-sectional view along line D-D of FIG. 10, FIG. 14 is a cross-sectional view taken along line E-E of FIG. 10, and FIG. 15 is a cross-sectional view taken along line F-F of FIG. 10.

Referring to FIGS. 13 to 15, the outer bead 110 may include a first groove surface 112 connecting between groove walls 111. In addition, the outer bead may have a first bead depth D1 that is a distance between the outer side wall 11 and the first groove surface.

The inner bead 120 may include a second groove surface 122 connecting between groove walls 121. In addition, the inner bead may have a second bead depth D2 that is a distance between the inner side wall 12 and the second groove surface.

Referring to FIGS. 13 to 15 together with FIG. 12, in the front side member 10 for a vehicle according to the fourth embodiment of the present disclosure, the outer bead 110 may include a region in which the first bead depth D1 is changed in the longitudinal direction (X) of the vehicle body.

In the front side member 10 for a vehicle according to the fourth embodiment of the present disclosure, the inner bead 120 may include a region in which the second bead depth D2 varies in the longitudinal direction X of the vehicle body.

Accordingly, the first groove surface 112 of the outer bead 110 may include a first inclined surface 113 inclined at a second angle b with respect to the longitudinal axis O of the vehicle body. Further, the first groove surface of the outer bead may include a second inclined surface 114 inclined at a third angle c with respect to the longitudinal axis of the vehicle body. Here, the third angle (c) may be greater than the second angle (b) and the first angle (a).

The second groove surface 122 of the inner bead 120 may include a third inclined surface 123 inclined at a second angle b with respect to the longitudinal axis O of the vehicle body. For example, the third sloped surface may extend from the front end to the rear end of the inner side wall.

The second angle (b) between the first inclined surface 113 of the outer bead 110 and the third inclined surface 123 of the inner bead 120 has a range of approximately 0 to 3 degrees. Thereby, the first inclined surface of the outer bead and the third inclined surface of the inner bead may be disposed parallel or almost parallel to the longitudinal axis O of the vehicle body.

The second angle b of the outer bead 110 and the inner bead 120 with respect to the longitudinal axis O of the vehicle body may be less than the first angle (a) that the outer side wall 11 and the inner side wall 12 have with respect to the longitudinal axis of the vehicle body, due to the inclined arrangement of the front side member (10).

Because of this configuration, in the front side member 10 for a vehicle according to the fourth embodiment of the present disclosure, for example, as illustrated in FIG. 13, the second bead depth D2 of the inner bead 120 becomes the deepest, while the outer wall 11 may be formed without a bead on the rear end, while the outer side wall 11 may be formed without beads. In addition, the inner rear 16 may overlap the inner side wall 12 and the outer rear 15 may be disposed apart from the outer side wall 11.

Then, for example, as illustrated in FIG. 14, the front side member 10 has a second bead depth D2 of the inner bead 120 and a first bead depth D1 of the outer bead 110 in the middle, which are the same as each other, or the second bead depth may be formed deeper than the first bead depth. Further, the outer rear 15 may be disposed adjacent to or overlapping the outer side wall 11 rather than on the rear end.

Subsequently, for example, in the front side member 10 as illustrated in FIG. 15, the inner bead 120 has a second bead depth D2 that gradually becomes shallower toward the front end, and the outer bead 110 has a first bead depth (D1) formed gradually deeper. In addition, the reinforcing member 17 may be installed on the front end of the outer side wall 11 across the outer bead 110.

In other words, the first bead depth D1 of the outer bead 110 may gradually increase toward the front of the vehicle body. Conversely, the second bead depth D2 of the inner bead 120 may gradually become shallower toward the front of the vehicle body.

In the front side member 10 for a vehicle according to the fourth embodiment of the present disclosure, as illustrated in FIGS. 13 to 15, the first groove surface 112 of the outer bead 110 and the second groove surface 122 of the inner bead 120 may contact each other. In detail, the first inclined surface 113 of the outer bead and the third inclined surface 123 of the inner bead may contact each other.

A welded part or an adhesive layer may be formed between the first groove surface 112 and the second groove surface 122 in contact with each other. The welded part may be formed by welding such as spot welding, laser welding, or the like. The adhesive layer may be formed by an adhesive such as a structural adhesive or the like.

However, it is not necessarily limited thereto, and for example, the first groove surface 112 and the second groove surface 122 may simply face each other without welding or an adhesive layer, or may be coupled with rivets or the like.

Alternatively, as in the third embodiment of the present disclosure illustrated in FIGS. 8 and 9, in the front side member 10 for a vehicle according to the fourth embodiment of the present disclosure, the first groove surface 112 of the outer bead 110 and the inner groove surfaces 122 of the bead 120 may be spaced apart from each other.

In the front side member 10 for a vehicle according to the fourth embodiment of the present disclosure, first, the outer bead 110 of the outer side wall 11 and the inner bead 120 of the inner side wall 12 are formed, so that the stiffness of the vehicle body or the front side member in the longitudinal direction (X) may be improved, thereby increasing the absorbable load.

In addition, the front side member 10 for a vehicle according to the fourth embodiment of the present disclosure may transfer the crash load to the rear of the vehicle body in a small overlap collision as well as in a full-frontal collision due to the inclined arrangement thereof, and thus the collision performance of the vehicle body may be improved.

For example, in the case of an electric vehicle, even though the weight of the vehicle increases due to the mounting of the battery and the space of the vehicle body is reduced, there is an advantage of securing crash performance and safety. This may lead to improvement in the marketability of the vehicle.

In addition, in the front side member 10 for a vehicle according to the fourth embodiment of the present disclosure, the outer rear 15 is coupled to the outer side wall 11 and the inner rear 16 is coupled to the inner side wall 12, so that the assemblability to the vehicle body of the front side member may be improved, the crash load may be reliably transferred to at least the front cross member 20, and the ability to absorb collision energy in the event of a frontal collision of the vehicle may be maximized by strengthening the support rigidity.

Therefore, the front side member 10 for a vehicle according to the fourth embodiment of the present disclosure may secure excellent crash performance, and may realize cost reduction in terms of materials and construction methods because steel may be applied, and a lightweight and structurally robust front side member may be provided.

Figure 16:
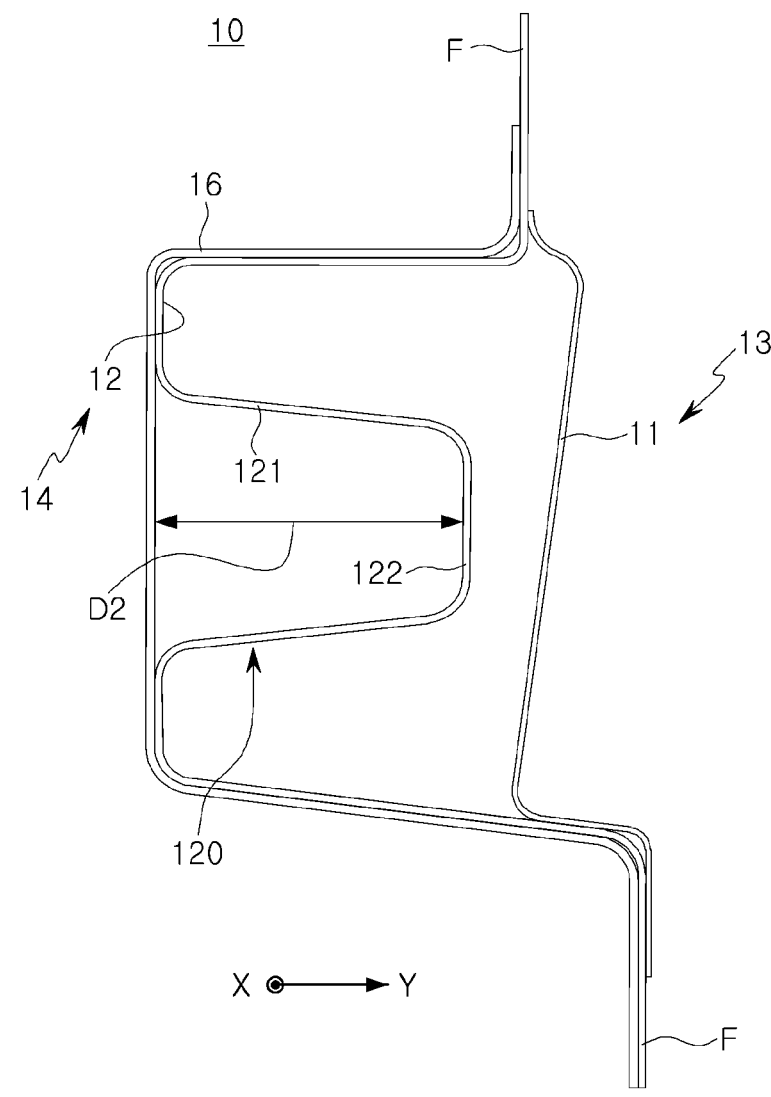
FIG. 16 is a cross-sectional view of a front side member for a vehicle according to a fifth embodiment of the present disclosure, and is a view of a portion corresponding to FIG. 13.

FIG. 16 is a cross-sectional view of a front side member for a vehicle according to a fifth embodiment of the present disclosure, and is a view of a portion corresponding to FIG. 13.

The fifth embodiment of the present disclosure illustrated in FIG. 16 differs only in that the outer rear 15 is omitted, and the rest of the components are the same as those of the aforementioned fourth embodiment.

Here, the outer rear 15 may be completely removed or, for example, formed continuously and integrally with the side outer panels 13 to extend linearly following the side outer panels.

Figure 17:
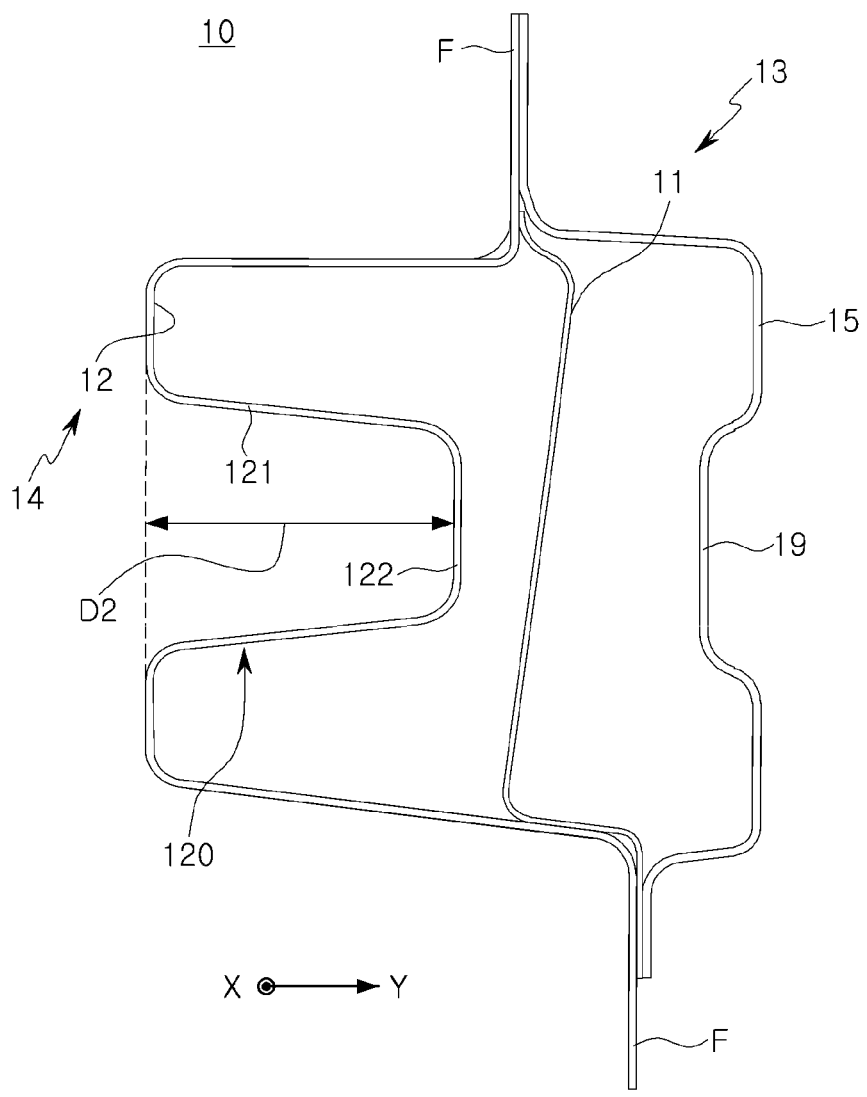
FIG. 17 is a cross-sectional view of a front side member for a vehicle according to a sixth embodiment of the present disclosure, and is a view of a portion corresponding to FIG. 13.

FIG. 17 is a cross-sectional view of a front side member for a vehicle according to a sixth embodiment of the present disclosure, and is a view of a portion corresponding to FIG. 13.

The sixth embodiment of the present disclosure illustrated in FIG. 17 differs only in that the inner rear 16 is omitted, and the rest of the components are the same as those of the aforementioned fourth embodiment.

Here, the inner rear 16 may be completely removed or, for example, formed continuously and integrally with the side inner panel 14 to extend linearly following the side inner panel.

Figure 18:
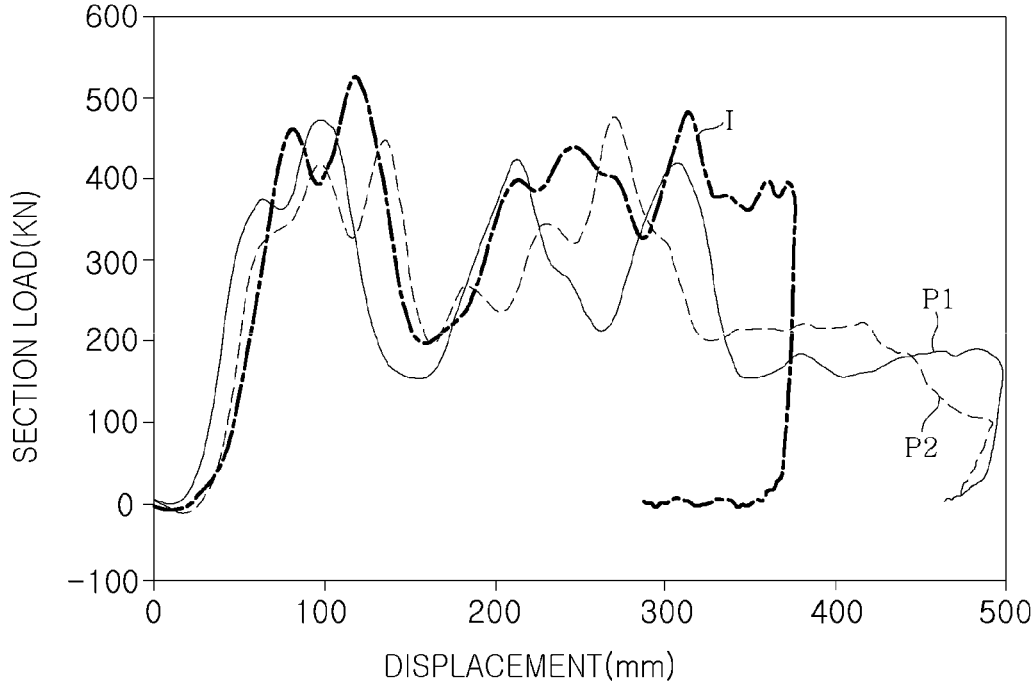
FIGS. 18 and 19 are graphs illustrating the shapes of deformation through analysis of the front side member for a vehicle according to the present disclosure and the related art in the event of a full frontal collision.
Figure 19:
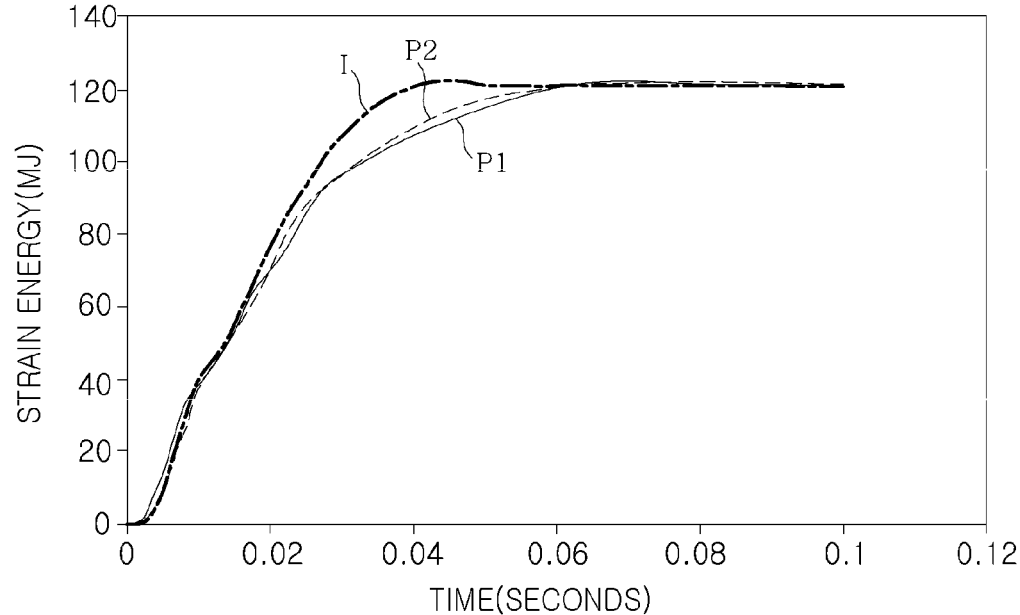

FIGS. 18 and 19 are graphs illustrating the shapes of deformation through analysis of the front side member for a vehicle according to the present disclosure and the related art in the event of a full frontal collision.

FIG. 18 illustrates a first front side member (P1) of the related art disposed parallel to the longitudinal axis of the vehicle body, a second front side member P2 of the related art disposed obliquely at a predetermined angle with respect to the longitudinal axis of the vehicle body, and a cross-sectional load according to the displacement of the front side member (I) according to the first embodiment of the present disclosure.

Here, the analysis was conducted under the overall frontal collision condition with the same bumper beams attached to the first and second front side members P1 and P2 of the related art and the front side member I of the present disclosure.

In addition, the front side members P1, P2 and I are commonly formed by combining a side outer panel and a side inner panel made of 980 DP steel by welding.

In the related art first and second front side members P1 and P2, the side outer panel and the side inner panel have a thickness of 1.6 mm and a weight of about 4.8 Kg. The front side member (I) of the present disclosure has a side outer panel and a side inner panel having a thickness of 1.2 mm and a weight of about 4.7 Kg.

The second front side member P2 of the related art and the front side member I of the present disclosure are disposed inclined at an angle of 6.3 degrees with respect to the longitudinal axis of the vehicle body. In the front side member (I) of the present disclosure, the second angle (b) between the first inclined surface 113 of the outer bead 110 and the third inclined surface 123 of the inner bead 120 is 2 degrees.

Referring to FIG. 18, although the related art first front side member (P1) is somewhat dominant in the load that the cross section receives vertically at the beginning of the collision, it can be seen that the front side member (I) of the present disclosure is much greater in the load received by the section perpendicularly in the total deformation.

While the first and second front side members P1 and P2 of the related art have a cross-sectional load of up to 470 KN, the front side member I of the present disclosure has a cross-sectional load of up to 520 KN.

Moreover, the entire behavior of the front side member (I) of the present disclosure stops at a displacement of about 380 mm, and this provides that a larger impact energy is absorbed within a shorter displacement than the first and second front side members P1 and P2 of the related art, in which the entire motion stops in excess of 110 mm.

FIG. 19 illustrates a first front side member (P1) of the related art disposed parallel to the longitudinal axis of the vehicle body, a second front side member P2 of the related art disposed obliquely at a predetermined angle with respect to the longitudinal axis of the vehicle body, and energy absorption capability over time of the front side member (I) according to the first embodiment of the present disclosure.

Referring to FIG. 19, the total strain energy in the final state is at a similar level, but the increase in strain energy is greatest in the front side member (I) of the present disclosure. Moreover, since the strain energy of the front side member (I) of the present disclosure in the period of 0.04 to 0.06 seconds is higher than that of the first and second front side members P1 and P2 of the related art, it clearly illustrates that the front side member (I) of the present disclosure has a comparative advantage in energy absorption capability according to strain.

Figure 20:
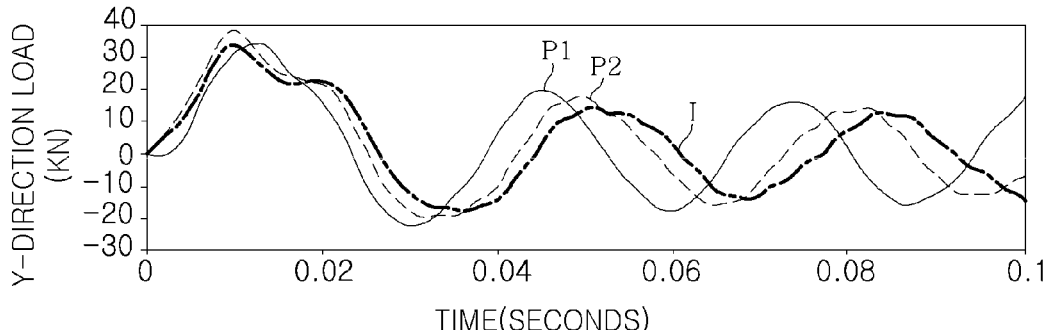
FIGS. 20 and 21 are graphs illustrating deformation shapes through analysis of the front side member for a vehicle according to the present disclosure and the related art in the event of a small overlap collision.
Figure 21:
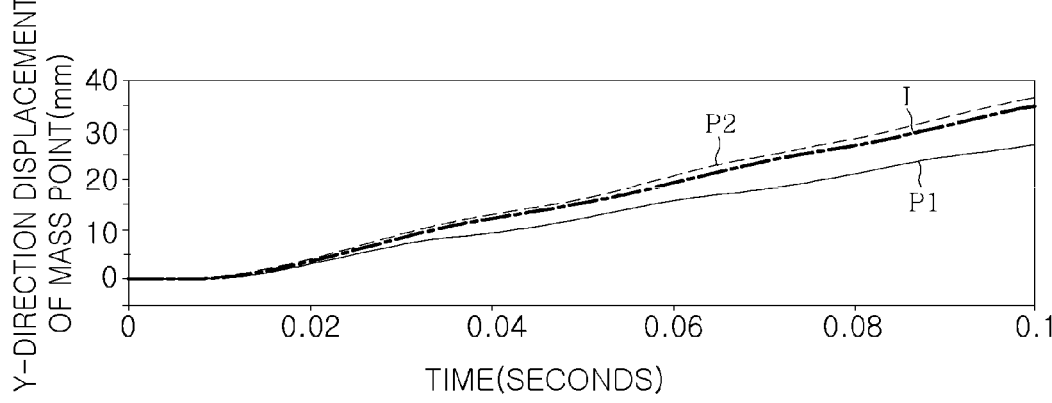

FIGS. 20 and 21 are graphs illustrating deformation shapes through analysis of the front side member for a vehicle according to the present disclosure and the related art in the event of a small overlap collision.

FIG. 20 illustrates a first front side member (P1) of the related art disposed parallel to the longitudinal axis of the vehicle body, a second front side member P2 of the related art disposed obliquely at a predetermined angle with respect to the longitudinal axis of the vehicle body, and a load in the Y direction (vehicle width direction) over time of the front side member I according to the first embodiment of the present disclosure.

Here, the first and second front side members P1 and P2 of the related art and the front side member I of the present disclosure were analyzed under the small overlap collision condition with the same bumper beam mounted thereon. In addition, the analysis conditions in terms of the configuration of the front side members are the same as those of the aforementioned overall frontal collision conditions.

In the event of a small overlap collision, when a vehicle running at 64 km/h is blocked by an obstacle and the speed is instantly reduced to 0 km/h and rotates, there is a problem in which the behavior of passengers becomes unstable. On the other hand, if a slide away behavior in which the vehicle moves slightly in the Y direction and slides at the initial time of the small overlap collision is implemented, the passenger's behavior is more stabilized and the possibility of injury may be reduced.

To implement such a slide-away behavior, the transmission path of collision energy in the vehicle body should have strength and rigidity of a certain level or higher, and each path should be firmly connected.

Referring to FIG. 20, since the related art first front side member does not directly contact an obstacle, the Y-direction load increases more slowly than other front side members at the beginning of a collision. Accordingly, the related art first front side member is disadvantageous to the slide-away behavior, and the vehicle is likely to be yawing.

FIG. 21 illustrates a first front side member (P1) of the related art disposed parallel to the longitudinal axis of the vehicle body, a second front side member P2 of the related art disposed obliquely at a predetermined angle with respect to the longitudinal axis of the vehicle body, and displacement of the mass point in the Y direction (vehicle width direction) of the front side member I according to the first embodiment of the present disclosure with time.

Referring to FIG. 21, it can be seen that the second front side member P2 of the related art and the front side member I of the present disclosure disposed obliquely at a predetermined angle with respect to the longitudinal axis of the vehicle body may further move the vehicle in the Y direction in the event of a small overlap collision, compared to the first front side member P1 of the related art disposed parallel to the longitudinal axis of the vehicle body.

Therefore, according to the present disclosure, the deformation behavior of the front side member is excellent in a full frontal collision, so that the energy of the collision may be effectively absorbed.

In addition, according to the present disclosure, the collision performance of the vehicle body may be improved and passengers may be safely protected by maximizing the widthwise behavior of the vehicle in a small overlap collision.

Furthermore, according to the present disclosure, excellent crash performance may be secured and steel may be applied, and thus cost reduction may be obtained in terms of materials and construction methods, and a lightweight and structurally strong front side member may be provided.

The above description is merely an example of the technical idea of the present disclosure, and various modifications and variations may be made to those skilled in the art without departing from the essential characteristics of the present disclosure.

For example, the above-described and illustrated embodiments of the present disclosure may be combined with each other, and each embodiment may optionally further employ some components of other embodiments as needed.

In addition, in this specification, a side member installed at the front of a vehicle body is described as an example, but it is not necessarily limited thereto, and the technical idea of the present disclosure may be applied to a side member installed at the rear of a vehicle body as well.

Therefore, the embodiments disclosed in the present disclosure are not intended to limit the technical idea of the present disclosure, but to explain, and the scope of the technical idea of the present disclosure is not limited by these examples. The protection scope of the present disclosure should be interpreted by the claims below, and all technical ideas within the equivalent range should be construed as being included in the scope of the present disclosure.

INDUSTRIAL APPLICABILITY

In this manner, the present disclosure is useful, for example, for vehicles requiring rigidity of the body.

The invention claimed is:

1. A front side member for a vehicle, comprising:
an outer side wall;
an inner side wall disposed opposite to the outer side wall;
an outer bead formed in a longitudinal direction of a vehicle body on the outer side wall and having a first groove surface; and
an inner bead formed in the longitudinal direction of the vehicle body on the inner side wall and having a second groove surface,
wherein the outer bead includes a region in which a first bead depth, a distance between the outer side wall and the first groove surface, is changed in the longitudinal direction of the vehicle body, and
the inner bead includes a region in which a second bead depth, a distance between the inner side wall and the second groove surface, is changed in the longitudinal direction of the vehicle body, wherein the outer side wall and the inner side wall are disposed inclined at a first angle with respect to a longitudinal axis of the vehicle body.

2. The front side member for a vehicle of claim 1, wherein the first groove surface connects between groove walls of the outer bead and includes a first inclined surface disposed inclined at a second angle with respect to the longitudinal axis of the vehicle body, and
the second groove surface connects between groove walls of the inner bead and includes a third inclined surface inclined at the second angle with respect to the longitudinal axis of the vehicle body.

3. The front side member for a vehicle of claim 2, wherein the second angle is less than the first angle.

4. The front side member for a vehicle of claim 3, wherein the first groove surface includes a second inclined surface inclined at a third angle with respect to the longitudinal axis of the vehicle body, and
the third angle is greater than the first angle.

5. The front side member for a vehicle of claim 4, wherein the first groove surface further includes a first connection surface connecting the first inclined surface and the second inclined surface,
wherein the first connection surface extends in the outer bead in parallel with the outer side wall in the longitudinal direction of the vehicle body, and
the first bead depth of the outer bead is changed from a connection point of the first connection surface and the first inclined surface.

6. The front side member for a vehicle of claim 2, wherein the second groove surface includes a fourth inclined surface inclined at a fourth angle with respect to the longitudinal axis of the vehicle body, wherein the fourth angle is greater than the first angle.

7. The front side member for a vehicle of claim 6, wherein the second groove surface further includes a second connection surface connecting the third inclined surface and the fourth inclined surface, wherein the second connection surface extends in the inner bead in parallel with the inner side wall in the longitudinal direction of the vehicle body, and
the second bead depth of the inner bead is changed from a connection point of the second connection surface and the third inclined surface.

8. The front side member for a vehicle of claim 2, wherein on one end of the front side member, the outer bead is not formed on the outer side wall and the inner bead is not formed on the inner side wall.

9. The front side member for a vehicle of claim 8, wherein the first bead depth of the outer bead gradually deepens toward the other end of the front side member, and
the second bead depth of the inner bead gradually becomes shallower toward the other end from the third inclined surface.

10. The front side member for a vehicle of claim 9, wherein in the middle between the one end and the other end of the front side member, the second bead depth and the first bead depth are the same or the second bead depth is formed deeper than the first bead depth.

11. The front side member for a vehicle of claim 2, wherein the first inclined surface of the outer bead and the third inclined surface of the inner bead are in contact with each other.

12. The front side member for a vehicle of claim 2, wherein the first inclined surface of the outer bead and the third inclined surface of the inner bead are spaced apart from each other at regular intervals.

13. The front side member for a vehicle of claim 2, wherein the outer side wall is provided on a side outer panel,
the inner side wall is provided on a side inner panel, and
the side inner panel is coupled to one side of the side outer panel to form a tubular member having a closed cross section.

14. The front side member for a vehicle of claim 13, further comprising an outer rear of which one side is coupled so as to branch and extend from an end of the side outer panel in a direction different from an extending direction of the side outer panel, therein the other end of the outer rear is connected to a side sill or a front cross member of the vehicle body.

15. The front side member for a vehicle of claim 14, wherein on the one side of the outer rear, an auxiliary bead is formed in a shape corresponding to a portion of the outer bead.

16. The front side member for a vehicle of claim 14, wherein the outer rear has a higher strength than the outer side wall or is formed thicker than the outer side wall.

17. The front side member for a vehicle of claim 13, further comprising an inner rear having one side coupled, to extend from an end of the side inner panel,
wherein the other end of the inner rear is connected to a front cross member or a dash panel of the vehicle body.

18. The front side member for a vehicle of claim 17, wherein the inner rear has a higher strength than the inner side wall or is formed to be thicker than a thickness of the inner side wall.

19. The front side member for a vehicle of claim 17, wherein the third inclined surface of the second groove surface extends from one end to the other end of the inner side wall.

* * * * *